(12) United States Patent
Fong et al.

(10) Patent No.: US 9,888,484 B2
(45) Date of Patent: Feb. 6, 2018

(54) REFERENCE SIGNAL FOR A COORDINATED MULTI-POINT NETWORK IMPLEMENTATION

(71) Applicant: BlackBerry Limited, Waterloo (CA)

(72) Inventors: Mo-Han Fong, Sunnyvale, CA (US); Dongsheng Yu, Nepean (CA); Hua Xu, Ottawa (CA); Robert Novak, Stittsville (CA); Shiguang Guo, Kanata (CA); Zhijun Cai, Ashburn, VA (US); Youn Hyoung Heo, San Jose, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/040,619

(22) Filed: Feb. 10, 2016

(65) Prior Publication Data

US 2016/0174235 A1 Jun. 16, 2016

Related U.S. Application Data

(63) Continuation of application No. 13/578,550, filed as application No. PCT/US2011/024735 on Feb. 14, 2011, now Pat. No. 9,270,347.

(Continued)

(51) Int. Cl.
*H04W 72/04* (2009.01)
*H04W 72/08* (2009.01)
(Continued)

(52) U.S. Cl.
CPC .......... *H04W 72/085* (2013.01); *H04B 7/024* (2013.01); *H04L 5/0023* (2013.01);
(Continued)

(58) Field of Classification Search
CPC .. H04L 5/0023; H04L 25/0204; H04W 24/10; H04B 7/024
See application file for complete search history.

(56) References Cited

U.S. PATENT DOCUMENTS 8,676,133 B2 3/2014 Montojo et al.
2004/0242257 A1 12/2004 Valkealahti et al.
(Continued)

FOREIGN PATENT DOCUMENTS

CN 101635950 1/2010
WO 2010017334 2/2010

OTHER PUBLICATIONS

"Enhanced Dynamic Cell Selection with Muting Scheme for DL CoMP in LTE-A", I Minghai Feng, IEEE, Published in 2010 IEEE 71st Vehicular Technology Conference; Year 2010, pp. 1-5.*

(Continued)

*Primary Examiner* — Ricky Ngo
*Assistant Examiner* — Lan Huong Truong
(74) *Attorney, Agent, or Firm* — Fish & Richardson P.C.

(57) ABSTRACT

A system and method of receiving a channel state information reference signal (CSI-RS) is presented. At a user equipment, a first CSI-RS transmitted from a base station is received. In some implementations, the first CSI-RS is transmitted at a first periodicity using a first set of antenna ports. At the user equipment, a second CSI-RS transmitted from the base station is received. In some implementations, the second CSI-RS is transmitted at a second periodicity using a second set of antenna ports. At least one of the first CSI-RS and the second CSI-RS is used to perform channel measurement.

20 Claims, 26 Drawing Sheets

Related U.S. Application Data

(60) Provisional application No. 61/304,366, filed on Feb. 12, 2010.

(51) Int. Cl.
    *H04B 7/024*     (2017.01)
    *H04L 5/00*     (2006.01)
    *H04L 25/02*     (2006.01)
    *H04W 24/10*     (2009.01)
    *H04W 76/04*     (2009.01)

(52) U.S. Cl.
    CPC .......... *H04L 5/0048* (2013.01); *H04L 5/0073* (2013.01); *H04L 25/0204* (2013.01); *H04W 24/10* (2013.01); *H04W 76/046* (2013.01)

(56) References Cited

U.S. PATENT DOCUMENTS

| | | |
|---|---|---|
| 2006/0193339 A1 | 8/2006 | Wang et al. |
| 2006/0270360 A1 | 11/2006 | Han et al. |
| 2008/0125124 A1 | 5/2008 | Craig |
| 2008/0212460 A1 | 9/2008 | Sampath |
| 2008/0300022 A1 | 12/2008 | Dong et al. |
| 2009/0058725 A1 | 3/2009 | Barker et al. |
| 2009/0061939 A1 | 3/2009 | Andersson et al. |
| 2009/0073959 A1 | 3/2009 | Xu |
| 2009/0088178 A1 | 4/2009 | Jugl et al. |
| 2009/0175159 A1 | 7/2009 | Bertrand et al. |
| 2009/0196204 A1 | 8/2009 | Astely et al. |
| 2009/0215468 A1 | 8/2009 | Miyano |
| 2009/0227261 A1* | 9/2009 | Tiirola ................ H04W 16/10 455/450 |
| 2009/0279430 A1 | 11/2009 | Huber et al. |
| 2009/0323616 A1 | 12/2009 | Zeller et al. |
| 2010/0008282 A1 | 1/2010 | Bhattad et al. |
| 2010/0027456 A1* | 2/2010 | Onggosanusi ......... H04B 7/024 370/312 |
| 2010/0034163 A1 | 2/2010 | Damnjanovic et al. |
| 2010/0035600 A1 | 2/2010 | Hou et al. |
| 2010/0035800 A1 | 2/2010 | Hou et al. |
| 2010/0067471 A1* | 3/2010 | Matsuzawa ............. H04L 5/003 370/329 |
| 2010/0104034 A1 | 4/2010 | Nam et al. |
| 2010/0120442 A1* | 5/2010 | Zhuang ............... H04B 7/15507 455/450 |
| 2010/0159936 A1* | 6/2010 | Brisebois ............ H04W 72/085 455/450 |
| 2010/0197298 A1 | 8/2010 | So et al. |
| 2010/0202311 A1 | 8/2010 | Lunttila et al. |
| 2010/0238824 A1 | 9/2010 | Farajidana et al. |
| 2010/0254471 A1 | 10/2010 | Ko et al. |
| 2010/0272032 A1* | 10/2010 | Sayana ................. H04B 7/024 370/329 |
| 2011/0039583 A1* | 2/2011 | Frank ................... G01S 5/0226 455/456.5 |
| 2011/0081917 A1* | 4/2011 | Frank ................... G01S 5/0215 455/456.1 |
| 2011/0098054 A1* | 4/2011 | Gorokhov ............. H04B 7/024 455/452.1 |
| 2011/0143770 A1* | 6/2011 | Charbit ................ G01S 5/0036 455/456.1 |
| 2011/0194551 A1 | 8/2011 | Lee et al. |
| 2011/0237270 A1* | 9/2011 | Noh ..................... H04B 7/0413 455/450 |
| 2011/0244877 A1 | 10/2011 | Farajidana et al. |
| 2012/0220327 A1* | 8/2012 | Lee, II .............. H04W 72/1273 455/509 |
| 2013/0286880 A1 | 10/2013 | Lee et al. |

OTHER PUBLICATIONS

Partial Supplementary European Search Report issued in European Application No. 11742848.2 on Sep. 22, 2016.

Huawei; "Consideration on CSI-RS Design for CoMP and Text Proposal to 36.814"; 3GPP Draft (R1-093031); Shenzhen, China; Aug. 18, 2009.

Qualcomm Inc.,"Further Details of CSI-RS"; 3GPP Draft (R1-100681); Valencia, Spain; Jan. 12, 2010.

Jungnickel et al.; "Coordinated Multipoint Trials in the Downlink"; Proceedings of the 5th IEEE Broadband Wireless Access Workshop (BWAWS). Retrieved from the internet on Nov. 1, 2009; <http:www.easy-c.org/publications/CoMP_Trials_Globecom_BWAWS_2009_final.pdf>.

Huawei; "Consideration on CSI-RS Design for CoMP and Text Proposal to 36.814"; 3GPP TSG RAN WG1#57bis (R1-092364); Los Angeles, United States; Jun. 29-Jul. 3, 2009; 9 pages.

Huawei; "The Standardization Impacts of Downlink CoMP"; 3GPP TSG RAN WG1 Meeting #59bis (R1-100258); Valencia, Spain; Jan. 18-22, 2010; 3 pages.

Samsung; "Discussions on CSI-RS for LTE-Advanced"; 3GPP TSG RAN WG1 #58 (R1-093375); Shenzhen, China; Aug. 24-28, 2009; 5 pages.

Ericsson, ST-Ericsson; "On CSI RS Design"; 3GPP TSG-RAN WG1 #59bis (R1-100048); Valencia, Spain; Jan. 18-22, 2010; 2 pages.

Qualcomm Europe; "Details of CSI-RS"; 3GPP TSG-RAN WG1 #59 (R1-094867); Jeju, Korea; Nov. 9-13, 2009; 6 pages.

Nokia, Nokia Siemens Networks; "CSI-RS Design for LTE-Advanced Downlink"; 3GPP TSG RAN WG1 Meeting #56-bis (R1-091351); Seoul, Korea; Mar. 23-27, 2009; 1 pages.

CATT; "Consistent Design of CSR-RS for FDD and TDD"; 3GPP TSG RAN WG1 Meeting #58bis (R1-094137); Miyazaki, Japan; Oct. 12-16, 2009; 3 pages.

Motorola; "CSI-RS Design with Forward Compatibility with CoMP"; 3GPP TSG RAN1#59bis (R1-100209); Valencia, Spain; Jan. 18-22, 2010; 5 pages.

International Search Report and Written Opinion of the International Searching Authority issued in International Application No. PCT/US2011/24486 dated Apr. 12, 2011; 13 pages.

International Preliminary Report on Patentability in International Application No. PCT/US2011/24486, dated Aug. 23, 2012, 10 pages.

International Search Report and Written Opinion in International Application No. PCT/US2011/24739, dated Apr. 15, 2011, 9 pages.

International Preliminary Report on Patentability in International Application No. PCT/US2011/24739, dated Aug. 23, 2012, 6 pages.

International Search Report and Written Opinion in International Application No. PCT/US2011/024735, dated Apr. 6, 2011, 12 pages.

International Preliminary Report on Patentability in International Application No. PCT/US2011/024735, dated Aug. 23, 2012, 10 pages.

Extended European Search Report in European Application No. 11742952.2, dated Oct. 2, 2014, 6 pages.

Extended European Search Report issued in European Application No. 11742848.2 dated Jan. 17, 2017.

Extended European Search Report issued in European Application No. 11742949.8 dated Jun. 29, 2017; 12 pages.

Nortel Networks; "RS Design Considerations for High-Order MIMO in LTE-A"; TSG-RAN1 #54 (R1-083157); Jeju, Korea; Aug. 18-22, 2008; 6 pages.

Texas Instruments; "Common Reference Symbol Mapping/Signaling for 8 Transmit Antenna"; 3GPP TSG RAN WG1 #56 (R1-090591); Athens, Greece; Feb. 9-13, 2009; 8 pages.

Fujitsu; "DL Reference Signal Design for 8×8 MIMO in LTE-Advanced"; 3GPP TSG-RAN1 #56 (R1-090706); Athens, Greece: Feb. 9-13, 2009; 12 pages.

Texas Instruments; "Downlink Reference Signal Multiplexing for 8Tx Transmission"; 3GPP TSG RAN WG1 56 (R1-090592); Athens, Greece; Feb. 12-16, 2009; 11 pages.

Partial Supplementary European Search Report issued in European Application No. 11742949.8 dated Mar. 27, 2017.

Communication Pursuant to Article 94(3) EPC issued in European Application No. 11742952.2 on Dec. 1, 2017; 6 pages.

* cited by examiner

Port 0-3:

Possible PDCCH

DRS Port 5:

Subframe X

FIG. 7B
Subframe Y

FIG 9A

| CSI-RS port resources | | | | | |
|---|---|---|---|---|---|
| CSI-RS group #1 | cell #1 | cell #2 | cell #3 | cell #4 | cell #5 |
| 4 | ■ | | | | |
| 5 | ■ | | | | |
| 10 | | ■ | | | |
| 14 | | ■ | | | |
| 15 | | | ■ | | |
| 16 | | | ■ | | |
| 27 | | | | ■ | |
| 28 | | | | | ■ |
| 29 | | | | ■ | |
| 30 | | | | | ■ |

Mapping of CSI-RS ports to CSI-RS port resources for each cell within the CSI-RS group at subframe

FIG 9B

| CSI-RS port resources | | | | | |
|---|---|---|---|---|---|
| CSI-RS group #1 | cell #1 | cell #2 | cell #3 | cell #4 | cell #5 |
| 4 | | | | | ■ |
| 5 | | | | | ■ |
| 10 | ■ | | | | |
| 14 | ■ | | | | |
| 15 | | ■ | | | |
| 16 | | ■ | | | |
| 27 | | | ■ | | |
| 28 | | | | ■ | |
| 29 | | | ■ | | |
| 30 | | | | ■ | |

Mapping of CSI-RS ports to CSI-RS port resources for each cell within the CSI-RS group at subframe B

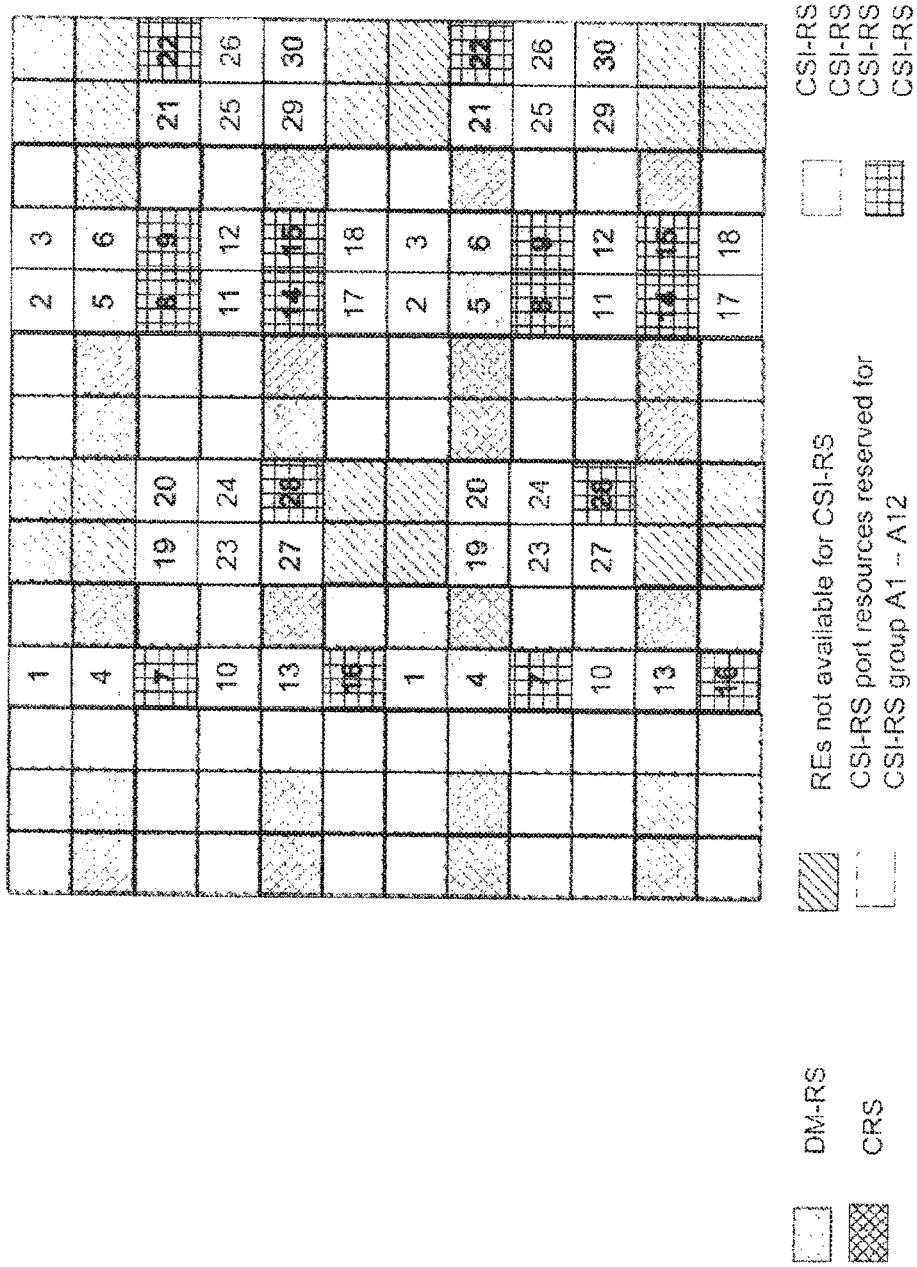

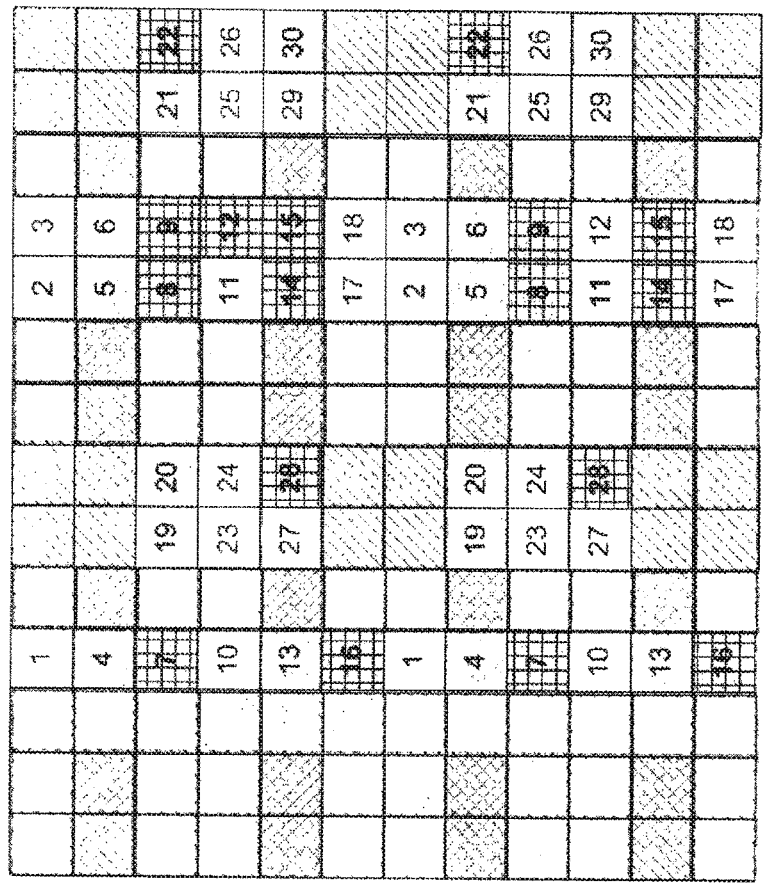

FIG 10C

Subframe Z

FIG. 11

| CSI-RS port resources reserved for the CSI-RS group | Logical CSI-RS port resources index | cell #1 | cell #2 | cell #3 | cell #4 | Cell #5 |
|---|---|---|---|---|---|---|
| 4 | 1 | | | | | |
| 5 | 2 | ■ | | | | |
| 10 | 3 | | | | | |
| 14 | 4 | | | | | |
| 15 | 5 | | ■ | | | |
| 16 | 6 | | | | | |
| 27 | 7 | | | ■ | | |
| 29 | 8 | | | | | |
| 28 | 9 | | | | ■ | |
| 30 | 10 | | | | | ■ |

FIG 12

REFERENCE SIGNAL FOR A COORDINATED MULTI-POINT NETWORK IMPLEMENTATION

CROSS-REFERENCE TO RELATED APPLICATIONS

This application a continuation of U.S. application Ser. No. 13/578,550, filed on Oct. 24, 2012, which is a U.S. National Stage of PCT/US2011/024735 filed on Feb. 14, 2011, which claims priority to and incorporates by reference U.S. provisional patent application No. 61/304,366 entitled "REFERENCE SIGNAL FOR A COORDINATED MULTI-POINT NETWORK IMPLEMENTATION" and filed on Feb. 12, 2010. The entire contents of which are hereby incorporated by reference.

BACKGROUND

The present invention relates generally to data transmission in mobile communication systems and more specifically to a channel state information (CSI) reference signal (RS) to support coordinated multi-point network implementations and heterogeneous networks.

As used herein, the terms "user equipment" and "UE" can refer to wireless devices such as mobile telephones, personal digital assistants (PDAs), handheld or laptop computers, and similar devices or other User Agents ("UAs") that have telecommunications capabilities. A UE may refer to a mobile, or wireless device. The term "UE" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the phrase "base station" or "access device" will refer to any component, such as a traditional base station or an LTE or LTE-A base station (including eNBs), that can provide a UE with access to other components in a telecommunications system.

In mobile communication systems such as the E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a scheduling channel.

It is generally desirable to provide a high data rate coverage using signals that have a high Signal to Interference Plus Noise ratio (SINR) for UEs serviced by a base station. Typically, only those UEs that are physically close to a base station can operate with a very high data rate. Also, to provide high data rate coverage over a large geographical area at a satisfactory SINR, a large number of base stations are generally required. As the cost of implementing such a system can be prohibitive, research is being conducted on alternative techniques to provide wide area, high data rate service.

Coordinated multi-point (CoMP) transmission and reception may be used to increase transmission data rate and/or signal quality in wireless communication networks such as LTE-A networks. Using CoMP, neighboring base stations coordinate to improve the user throughput or signal quality, especially for users at a cell edge. CoMP may be implemented using a combination of base stations such as eNBs, and/or relay nodes (RN) and/or other types of network nodes and/or cells.

FIG. 1 is an illustration of a wireless communications network having two eNBs operating in a CoMP transmission and reception configuration. A similar illustration can be applied to a combination of eNBs, RNs and/or cells. As illustrated in FIG. 1, in network coverage area 104, eNBs 106 and 108 are configured to transmit communication signals to UE 110. In network coverage area 104, any collaboration scheme may be used for eNBs 106 and 108. For example, in some CoMP schemes, eNB 106 and eNB 108 may work together to transmit the same signal to UE 110 at the same time. In such a system, the signals transmitted by the base stations combine (i.e., superpose) in the air to provide a stronger signal and thus increase the chance of transmission success. In other CoMP schemes, eNB 106 and eNB 108 transmit different signals to UE 110, which, for example, include different data that is to be communicated to UE 110. By transmitting different portions of the data through different eNBs, the throughput to UE 110 may be increased. The use of CoMP depends on many factors including channel conditions at UE 110, available resources, Quality of Service (QoS) requirements, etc. As such, in some network implementations, in a given node/cell or combination of nodes/cells only a subset of available UEs may be serviced with CoMP transmissions. For example, in FIG. 1, UE 112 is only served by eNB 108.

In LTE-A, CoMP can be used to improve the throughput for cell edge UEs as well as the cell average throughput. There are two primary mechanisms by which CoMP transmissions may be implemented to recognize these improvements. First, CoMP transmissions may provide coordinated scheduling, where data is transmitted to a single UE from one of the available transmission points (e.g., one of the available eNBs in FIG. 1 or one of the available network nodes or cells) and scheduling decisions are coordinated to control, for example, the interference generated in a set of coordinated cells. Secondly, CoMP transmissions may provide joint processing where data is simultaneously transmitted to a single UE from multiple transmission points, for example, to (coherently or non-coherently) improve the received signal quality and/or actively cancel interference for other UEs.

In the case of coordinated scheduling, data is only transmitted by the serving cell, but the scheduling decisions are made with coordination among the neighboring cells. In the case of joint processing CoMP transmission, multiple base stations transmit the data to the same user simultaneously. The UE then jointly processes the transmissions from multiple nodes to achieve a performance gain.

In CoMP implementations, the serving cell may be the cell transmitting Physical Downlink Control Channel (PDCCH) assignments (i.e., a single cell). This is analogous to the serving cell of Rel-8. In CoMP, dynamic cell selection involves a PDSCH transmission from one point within the CoMP cooperating set at a first time and in Coordinated Scheduling/Beamforming (CS/CB) data is only available at the serving cell (data transmission from that point) but user scheduling/beamforming decisions are made with coordination among cells corresponding to the CoMP cooperating set.

When implementing CoMP, a series of CoMP cell sets may be defined. In a CoMP cooperating set, a set of (geographically separated) points directly or indirectly participate in PDSCH transmission to the UE. The cooperating set may be transparent to the UE. CoMP transmission point(s) are a point or set of points actively transmitting PDSCH to the UE. CoMP transmission point(s) are a subset of the CoMP cooperating set. For joint transmission, the CoMP transmission points are the points in the CoMP cooperating set, but for dynamic cell selection, a single point is the transmission point at each subframe. The transmission point can change dynamically within the CoMP cooperating set. A CoMP measurement set is a set of cells about which channel state/statistical information (CSI) related to their link to the UE is reported. The CoMP measurement set may be the same as the CoMP cooperating set. A Radio Resource Measurement (RRM) measurement set is a set in support of RRM measurements that may be defined in Rel-8 and is, therefore, not CoMP-specific. For Coordinated scheduling/beamforming, the CoMP transmission point may correspond to the "serving cell."

In LTE systems, data is transmitted from an access device to UEs via Resource Blocks (RBs). Referring to FIG. 2, an exemplary resource block 50 is illustrated that is comprised of 168 Resource Elements (REs) (see exemplary elements 52) arranged in twelve frequency columns and fourteen time rows as known in the art. Accordingly, each element corresponds to a different time/frequency combination. The combination of elements in each time row are referred to as an Orthogonal Frequency Division Multiplexing (OFDM) symbol. In the illustrated example the first three OFDM symbols (in some cases it may be the first two, first four, etc.) are reserved for PDCCH 56 and are shown in FIG. 2 as gray REs collectively. Various types of data can be communicated in each RE.

LTE systems employ various types of reference signals to facilitate communication between an access device or base station and a UE. A reference signal can be used for several purposes including determining which of several different communication modes should be used to communicate with UEs, channel estimation, coherent demodulation, channel quality measurement, signal strength measurements, etc. Reference signals are generated based on data known to both an access device and a UE, and may also be referred to as pilot, preamble, training signals, or sounding signals. Exemplary reference signals include a cell specific reference signal (CRS) that is sent by a base station to UEs within a cell and is used for channel estimation and channel quality measurement, a UE-specific or dedicated reference signal (DRS) that is sent by a base station to a specific UE within a cell that is used for demodulation of a downlink, a sounding reference signal (SRS) sent by a UE that is used by a base station for channel estimation and channel quality measurement and a demodulation reference signal sent (DM-RS) by a UE that is used by a base station for channel estimation of an uplink transmission from the UE.

In LTE systems, CRSs and DRSs are transmitted by base stations in RB REs. To this end, see FIG. 2 which shows an exemplary CRS (three of which are labeled 52) in vertical, horizontal, left down to right and left up to right hatching for ports 0 through 3 respectively and exemplary DRS in dark REs to the right of the three columns of PDCCH 56, three of which are labeled 54. The reference signals allow any UEs communicating with the access device to determine channel characteristics and to attempt to compensate for poor characteristics. The CRSs are UE-independent (i.e., are not specifically encoded for particular UEs) and, in at least some cases, are included in all RBs. By comparing the received CRS to known reference signals (i.e., known data), a UE can determine channel characteristics (e.g., a channel quality information, etc.). The difference between the known data and the received signal may be indicative of signal attenuation, path-loss differences, etc.

UEs report channel characteristics back to the base station and the base station then modifies its output (i.e., subsequent REs) to compensate for the channel characteristics. To indicate how signal output is modified, the base station transmits a UE-specific DRS to each UE. Here again, DRS data is known at the UE and therefore, by analyzing received DRS the UE can determine how the access device output has been modified and hence obtain information required to demodulate data received in subsequent REs. In FIG. 2, exemplary CRS reference signals are indicated by hatching, DRS signals are indicated by dark REs and non-reference signal elements during which traffic data is transmitted are blank (i.e., white).

Referring again to FIG. 2, to avoid collisions, LTE system DRS 54 are generally allocated to OFDM symbols separate from those occupied by CRS. Furthermore, DRS 54 are generally allocated away from PDCCH 56. In release 8 LTE devices (hereinafter "Rel-8 devices"), for example, DRS of antenna port 5 may be specified for PDSCH demodulation as shown in FIG. 2. In some cases, CRS 52 on antenna ports 0-3 are distributed on all RBs in the system bandwidth, while DRS 54 on antenna port 5, for example, may only be allocated in RBs assigned to a corresponding UE. When a UE is assigned two or more contiguous RBs, DRS 54 allocation may simply be repeated from one RB 50 to the next.

Two new types of reference signals are defined in LTE-A for the purpose of channel estimation for demodulation: channel estimation for channel state information (CSI) measurement and channel quality indicator (CQI) measurement. The first type of RS is a UE-specific RS or UE-RS used for demodulation of the traffic channel assigned to the UE, i.e. the physical downlink shared channel (PDSCH). The UE-RS is also called demodulation RS (DM-RS). The second type of RS is a cell-specific RS used for CSI measurement and CQI measurement. In LTE-A, the LTE Rel-8 common reference signal (CRS) may be retained in non-Multicast/Broadcast over a Single Frequency Network (MBSFN) subframes to support legacy Rel-8 UEs. In an MBSFN subframe which may be used as a subframe to only support LTE-A UE, CRS may only be retained within the PDCCH region.

In some network implementations, then anticipated CSI-RS overhead is approximately 1/840=0.12% per antenna port (8 antenna ports=0.96%). For example, CSI-RS may be implemented with a time density of 1 symbol every 10 ms per antenna port: 1/140, or a frequency density of 1 subcarrier every 6 subcarriers per antenna port: 1/6. The periodicity of the CSI-RS signal may be adjusted by an integer number of timeframes. For DM-RS the broadcast rate is: Rank 1 transmission—12 REs per RB (same overhead as Rel-8); Rank 2 transmission—12 REs per RB to be confirmed, and Rank 3-8 transmissions—a maximum of 24 REs (total) per RB. Generally, the same REs per antenna port are transmitted for each DM-RS rank.

There are several difficulties associated with current CSI-RS designs. First, to support CoMP multi-cell CSI measurement at the UE, the UE is required to detect the CSI-RS transmitted by neighboring cells with a sufficient level of accuracy. However, because the signal strength received from neighboring cells can be relatively low compared to the signal strength received from the serving cell and the sum of the signal strength received from other neighboring cells, the received SINR of a neighboring cell CSI-RS can be quite low.

Also, existing CSI-RS design focuses on a homogeneous network scenario where only macro cells are deployed. Future networks, however, may be implemented using heterogeneous networks incorporating macro cells overlaid with small cells (also called low power nodes, e.g. femto cell, relay cell, pico cell etc.). In that case, the expected reuse cluster size will need to a much larger than the 6 to 8 cluster size currently specified. Because macro eNBs and small cell eNBs have very different transmit power (the transmit power of a macro eNB is 46 dBm (for 10 MHz bandwidth) whereas the transmit power of a pico eNB, femto eNB and relay node (RN) is 30 dBm, 20 dBm and 30 dBm respectively for 10 MHz bandwidth), the larger transmit power of the macro eNB will lead to severe DL interference experienced by a UE attached to the low power node that is located within the macro eNB coverage. This severe outer-cell interference will be detrimental to the performance of control channels (e.g. PDCCH), data channels (e.g. PDSCH) and RS detection, including CSI-RS detection.

Finally, to support CoMP with higher reuse cluster sizes and multi-antenna configurations, the number of CSI-RS antenna ports will be significant. To limit overhead, a larger periodicity of the CSI-RS may be required. A larger interval between CSI-RS transmissions may negatively affect detection performance of CSI-RS for a higher speed mobile that may, or may not, be in CoMP operation.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 7A-7C illustrate 3 CSI-RS groups where different sets of mutually exclusive (or orthogonal) CSI-RS port resources reserved for different CSI-RS groups are provided using TDM;

FIGS. 9A and 9B are illustrations of the CSI-RS port resources mapping of a first CSI-RS group over time;

FIGS. 10A-10C are illustrations of different or mutually orthogonal CSI-RS port resources reserved for different CSI-RS groups where 8 CSI-RS port resources (i.e. 16 REs) are reserved for each CSI-RS group in each of the three subframes X, Y, and Z;

FIG. 11 is an illustration of ordering of CSI-RS port resources reserved for a CSI-RS group and indexing each CSI-RS port resource with a logical index;

FIG. 12 is an illustration of available REs in an RB for CSI-RS in a MBSFN subframe;

DETAILED DESCRIPTION

Figure 1:
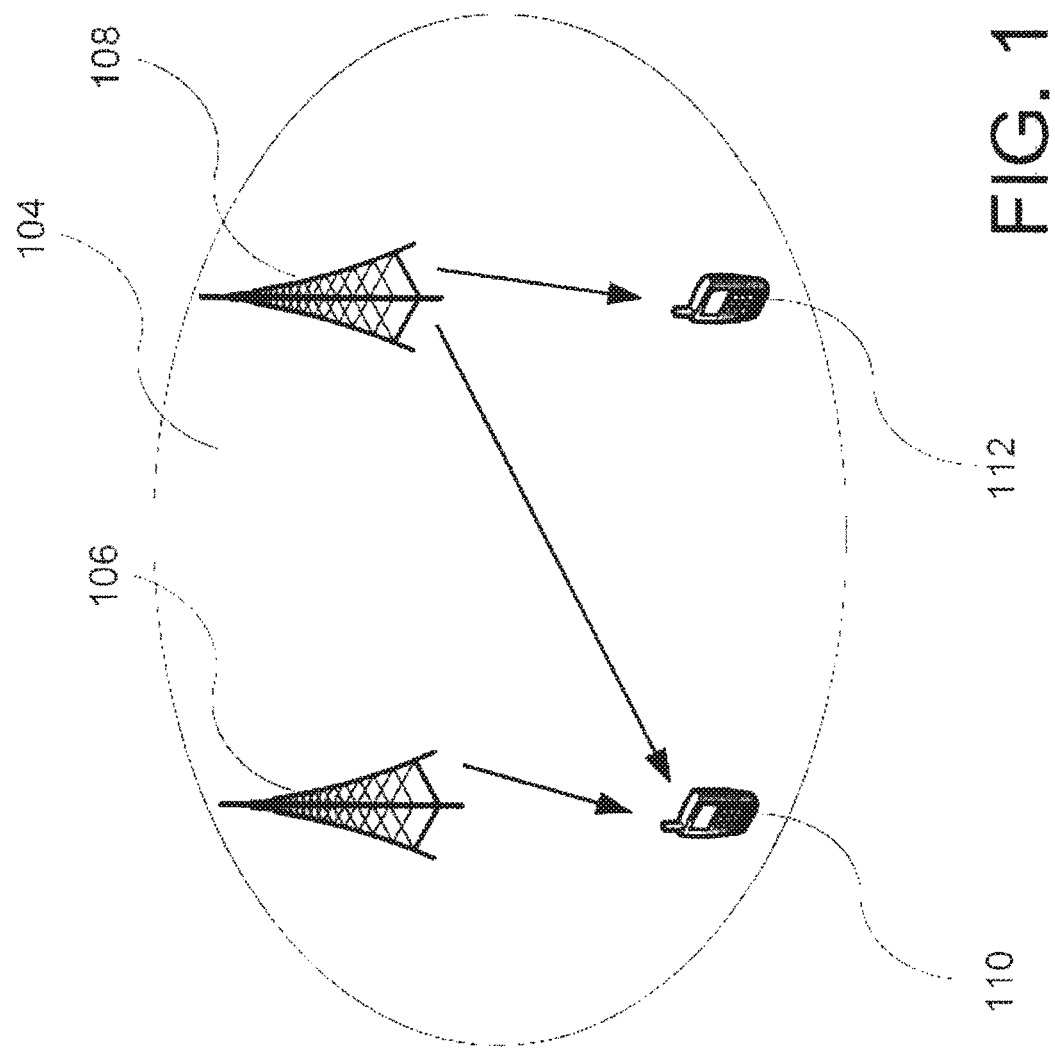
FIG. 1 is an illustration of a wireless communications network having two eNBs operating in a coordinated multipoint (CoMP) transmission and reception configuration.
Figure 2:
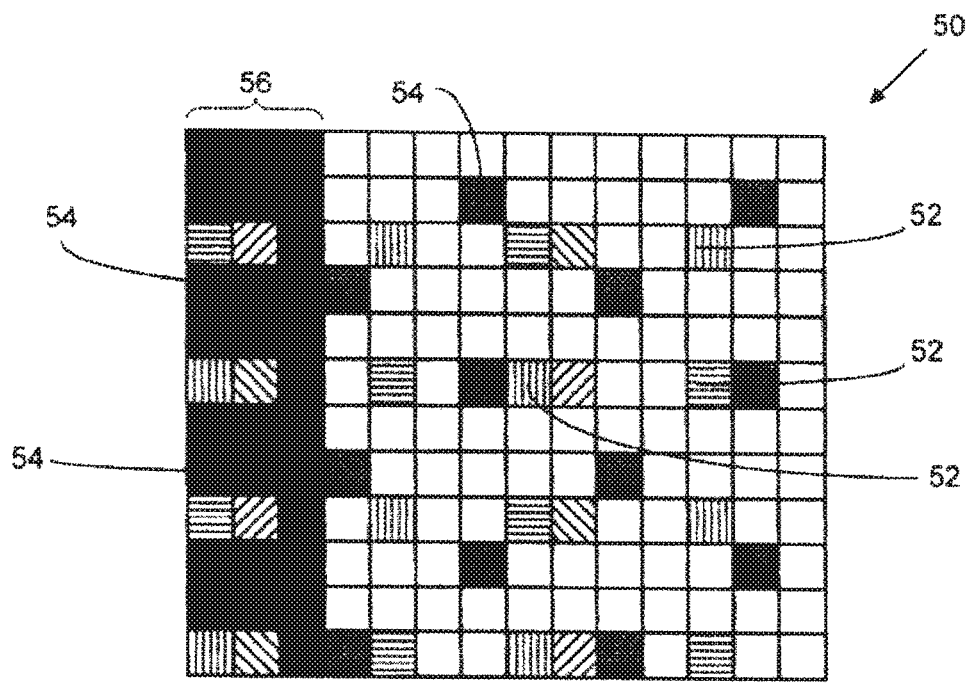
FIG. 2 illustrates a resource block (RB) including both CRS and a plurality of Dedicated Reference Signals (DRSs) distributed throughout the RB.

The present invention relates generally to data transmission in mobile communication systems and more specifically to a channel state information (CSI) reference signal (RS) to support coordinated multi-point (CoMP) network implementations and heterogeneous networks.

Some implementations include a method of decoding a channel state information reference signal (CSI-RS) using a user equipment (UE). The method includes receiving an indication of a resource element (RE) configuration allocated for transmission of CSI-RSs by a first cell. The indication is received from a second cell. The method includes at least one of using the indication of the RE configuration to decode a first CSI-RS received from the first cell, and using the indication of the RE configuration to mute one or more REs within a data channel transmission received from a third cell. The first cell, second cell and third cell may be associated within a CSI-RS group. At least two of the first cell, the second cell, and the third cell may be mutually interfering cells.

Other implementations include a method of transmitting a channel state information reference signal (CSI-RS) to a user equipment (UE). The method includes providing a first resource block (RB) configuration for at least one UE experiencing interference from a first set of interfering neighbor cells, providing a second RB configuration for at least one UE experiencing interference from a second set of interfering neighbor cells, and receiving a measurement report from a first UE. The measurement report identifies a set of interfering neighbor cells for the first UE. The method includes, when the set of interfering neighbor cells for the first UE is included within the first set of interfering neighbor cells, transmitting the first RB configuration to the first UE, and, when the set of interfering neighbor cells for the first UE is included within the second set of interfering neighbor cells, transmitting the second RB configuration to the first UE.

Other implementations include a method of receiving a channel state information reference signal (CSI-RS). The method includes transmitting a measurement report to a first cell. The measurement report identifies a set of interfering neighbor cells for the UE. The method includes receiving a resource block (RB) configuration from the first cell, and using the RB configuration to at least one of decode a CSI-RS received from an interfering cell and mute at least one resource element (RE) within a data channel transmission received from a second interfering cell.

Other implementations include a user equipment (UE) comprising a processor configured to receive an indication of a resource element (RE) configuration allocated for transmission of CSI-RSs by a first cell. The indication is received from a second cell. The processor is configured to at least one of use the indication of the RE configuration to decode a first CSI-RS received from the first cell, and use the indication of the RE configuration to mute one or more REs within a data channel transmission received from a third cell. The first cell, second cell and third cell may be associated within a CSI-RS group. At least two of the first cell, the second cell, and the third cell may be mutually interfering cells.

Other implementations include a base station comprising a processor configured to identify a first resource block (RB) configuration for at least one UE experiencing interference from a first set of interfering neighbor cells, identify a second RB configuration for at least one UE experiencing interference from a second set of interfering neighbor cells, and receive a measurement report from a first UE. The measurement report identifies a set of interfering neighbor cells for the first UE. The processor is configured to, when the set of interfering neighbor cells for the first UE is included within the first set of interfering neighbor cells, transmit the first RB configuration to the first UE, and, when the set of interfering neighbor cells for the first UE is included within the second set of interfering neighbor cells, transmit the second RB configuration to the first UE.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In network implementations that include several broadcasting neighboring cells, it may be difficult to receive and distinguish CSI-RSs transmitted by each of the neighboring cells. In some cases, the signal strength from the neighboring cells is relatively low compared to the signal strength from the serving cell. Also, the signal strength of a single neighboring cell is relatively low when compared to the sum of signals received from the other neighboring cells and the serving cell. To address these problems, in the present system and method, each of the neighboring cells may be configured to broadcast CSI-RSs using REs that are not in use by the other neighboring cells within the reuse cluster for CSI-RS transmission. For example, in a first neighbor cell, PDSCH REs that coincide with the CSI-RS transmitted by neighbor cells within the reuse cluster may be muted (e.g., not used) so that the REs do not interfere with one another. This may improve the neighbor cell CSI-RS detection and channel estimation accuracy to support CoMP transmission (e.g. joint processing (JP), coordinated beamforming (CB), etc).

Figure 3:
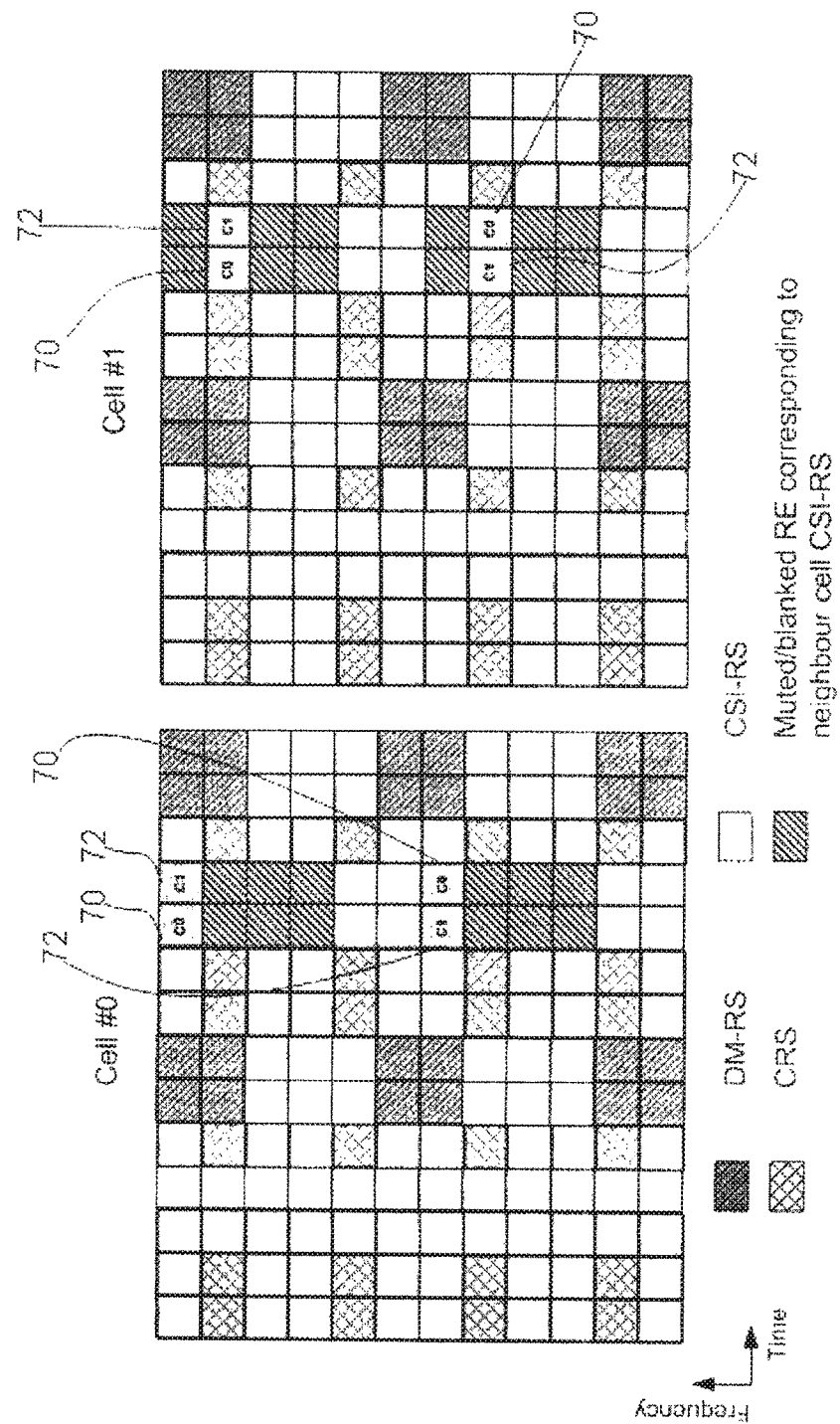
FIG. 3 is an illustration that shows two example orthogonal CSI-RS transmissions broadcast from first and second neighbor cells, where each CSI-RS transmission includes PDSCH RE muting.

FIG. 3 is an illustration that shows two example orthogonal CSI-RS transmissions broadcast from first and second neighbor cells, and muting of PDSCH REs in the first and second neighbor cells to avoid collision with the CSI-RS transmissions from each other and from other neighbor cells. By muting certain REs within each RB, interference to the CSI-RSs broadcast by each of Cell #0 and Cell #1 are minimized. With reference to FIG. 3, each of Cell #0 and Cell #1 use two CSI-RS antenna ports where each CSI-RS port transmits on two REs (see the pairs of REs labeled 70 and 72 in each CSI-RS for cell #0 and cell #1). To avoid interference between the CSI-RSs transmitted by each cell, the orthogonality of the CSI-RSs is maintained through time division multiplexing (TDM) and/or frequency division multiplexing (FDM) of REs within the RB. As shown in FIG. 3, the CSI-RS REs for cell #0 are offset by one subcarrier from the CSI-RS REs for cell #1. Furthermore, several PDSCH REs are muted, to minimize interference to CSI-RSs transmitted by other neighbor cells. In other words, the PDSCH REs that coincide with the CSI-RS REs transmitted by neighbor cells may be muted.

In the illustration of FIG. 3, there are a total of 16 REs that can be used within an RB for CSI-RS transmission or PDSCH RE muting. Accordingly, in this configuration, up to four different neighbor cells can transmit CSI-RSs using the RB configuration shown in FIG. 3 wherein the CSI-RS from each cell will not interfere with one another (as the CSI-RS REs of a single cell only overlap with muted REs broadcast by the remaining cells). Accordingly, the illustrated configuration supports up to 4 cells within the CSI-RS reuse cluster. To minimize the effect on Rel-8 UE PDSCH reception, it may be recommended that the number of muted or punctured REs per RB should be no more than 16, 24 or 32.

For a given CSI-RS configuration, the reuse factor indicates the number of neighbor cells that can transmit mutually orthogonal CSI-RSs. The orthogonality of CSI-RSs can be achieved by different cells transmitting CSI-RSs on different time/frequency tones or REs. The reuse factor for the CSI-RS on each subframe may be dependent on the maximum allowable number of muted/punctured REs per RB, the number of REs per CSI-RS antenna port per RB, the number of CSI-RS antenna ports (or transmit antennas) per cell. Table 1 illustrates different reuse factors resulting from different values of the number of REs per CSI-RS antenna port, and the number of CSI-RS antenna ports (or transmit antennas) per cell. It can be seen that if a CSI-RS is transmitted by each cell in every subframe, the reuse factor in some cases is not sufficient to support a homogeneous network and in all cases are not sufficient to support a heterogeneous network.

TABLE 1

| Maximum allowable number of muted/ punctured REs per RB, $N_{muted+punctured}$ | Number of REs per CSI-RS antenna port per RB, $N_{RE\_per\_antenna}$ | Number of CSI-RS antenna ports per cell (i.e. number of transmit antennas per cell), $N_{tx}$ | Reuse factor of CSI-RS per subframe, $R = N_{muted+punctured} / (N_{RE\_per\_antenna} \times N_{tx})$ |
|---|---|---|---|
| 16 | 2 | 2 | 4 |
| 16 | 2 | 4 | 2 |
| 16 | 2 | 8 | 1 |
| 16 | 1 | 2 | 8 |
| 16 | 1 | 4 | 4 |
| 16 | 1 | 8 | 2 |

A reuse cluster of neighbor cells, as described above does not take into account of the possibility of CSI-RS hopping to further randomize the CSI-RS collision and interference and does not differentiate between the maximum allowable number of muted/punctured REs per RB and the number of available resources of REs per RB that can be used for CSI-RS transmission. In some cases, the number of available resources of REs per RB that can be used for CSI-RS transmission can be much larger than the maximum allowable number of muted/punctured REs per RB.

Furthermore, the muting approach described above does not consider or compensate for a mixture of non-CoMP and CoMP network operations within a particular cell. Also, possible muting, TDM, and FDM approaches do not scale to support the high density deployment of small cell nodes and overlaid nature of a heterogeneous network.

Figure 4:
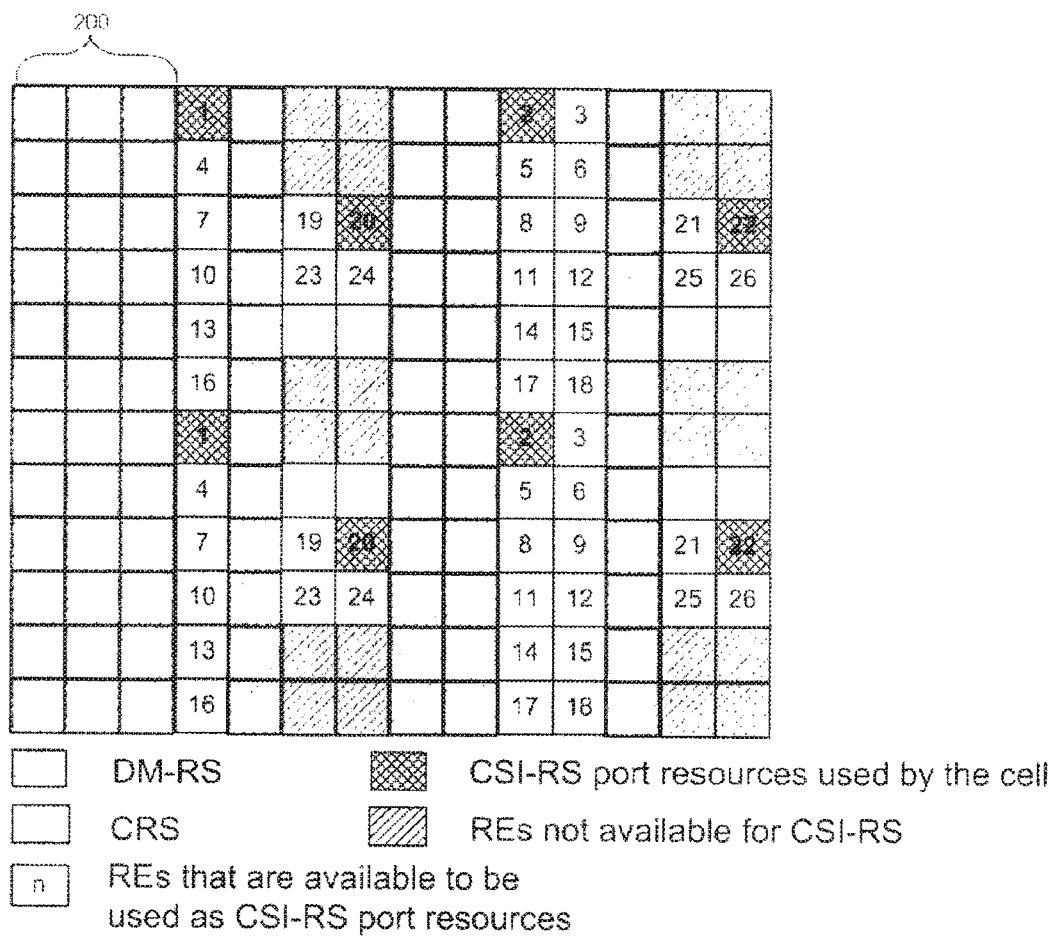
FIG. 4 is an illustration of an example of an RB having REs available for CSI-RS transmission, the REs are selected based upon several conditions.

CSI-RS hopping over time may randomize CSI-RS collisions among neighboring cells in the case of non-CoMP network implementations. FIG. 4 is an illustration of an example of an RB having REs available for CSI-RS transmission. The REs are selected based upon the following conditions: 1) the CSI-RS cannot puncture the PDCCH region, i.e. the first 3 OFDM symbols labeled 200; and 2) the CSI-RS cannot puncture the Rel-8 CRS and the Rel-9/Rel-10 DM-RS. In an RB there are 52 available REs for CSI-RS transmission assuming that the RE pair used for each CSI-RS port are 6 sub-carriers apart. As each CSI-RS port requires two REs, the total number of possible CSI-RS port resources is 26.

In one example implementation, a cell requires 4 CSI-RS ports, thus 8 of the available REs. In that case, the typical number of required REs for CSI-RS transmission (i.e., 8 CSI-RS REs as shown in this example or limited to 16, 24, 32 to avoid too much puncturing to Rel-8 PDSCH performance) is less than the total available REs for CSI-RS transmission (i.e., 52 in this case). Therefore, the mapping of CSI-RS ports to the available REs can hop over time and be randomized across neighbor cells. This provides randomization of CSI-RS collisions across neighbor cells, minimizing the inter-cell CSI-RS interference.

For heterogeneous networks, even without support of CoMP, however, in the case of severe interference caused by macro base stations to small cells, random hopping does not guarantee full collision avoidance and may be insufficient. Also, in the case of a CoMP network implementation, the described hopping may not ensure that the CSI-RS of different neighboring cells within the reuse cluster do not collide with one another.

In some cases, the CSI-RS ports (time/frequency locations) used by different cells and the hopping pattern may be defined based on cell ID. For CoMP, however, to maintain full orthogonality of CSI-RS among cells within the reuse cluster, cell ID-based CSI-RS ports allocation and hopping are not suitable. Similarly, for heterogeneous networks, to avoid severe interference from PDSCH transmissions and CSI-RS transmissions generated by macro cells with the CSI-RS of a small cell, the CSI-RS ports allocation to both macro cells and small cells need to be carefully planned and not randomized simply by cell ID.

In the present system, various CSI-RS groups may be defined, with each CSI-RS group including a group of adjacent network cells that may interfere with one another. The member cells of a CSI-RS group and the size of the group may be semi-statically configured by the network through, for example, RF planning or slowly adapting or dynamically adapting the group definitions based upon long term or shorter term observation of the UEs' RSRP/RSRQ/CQI feedback, UEs' distribution, and/or loading condition, etc.

Figure 5:
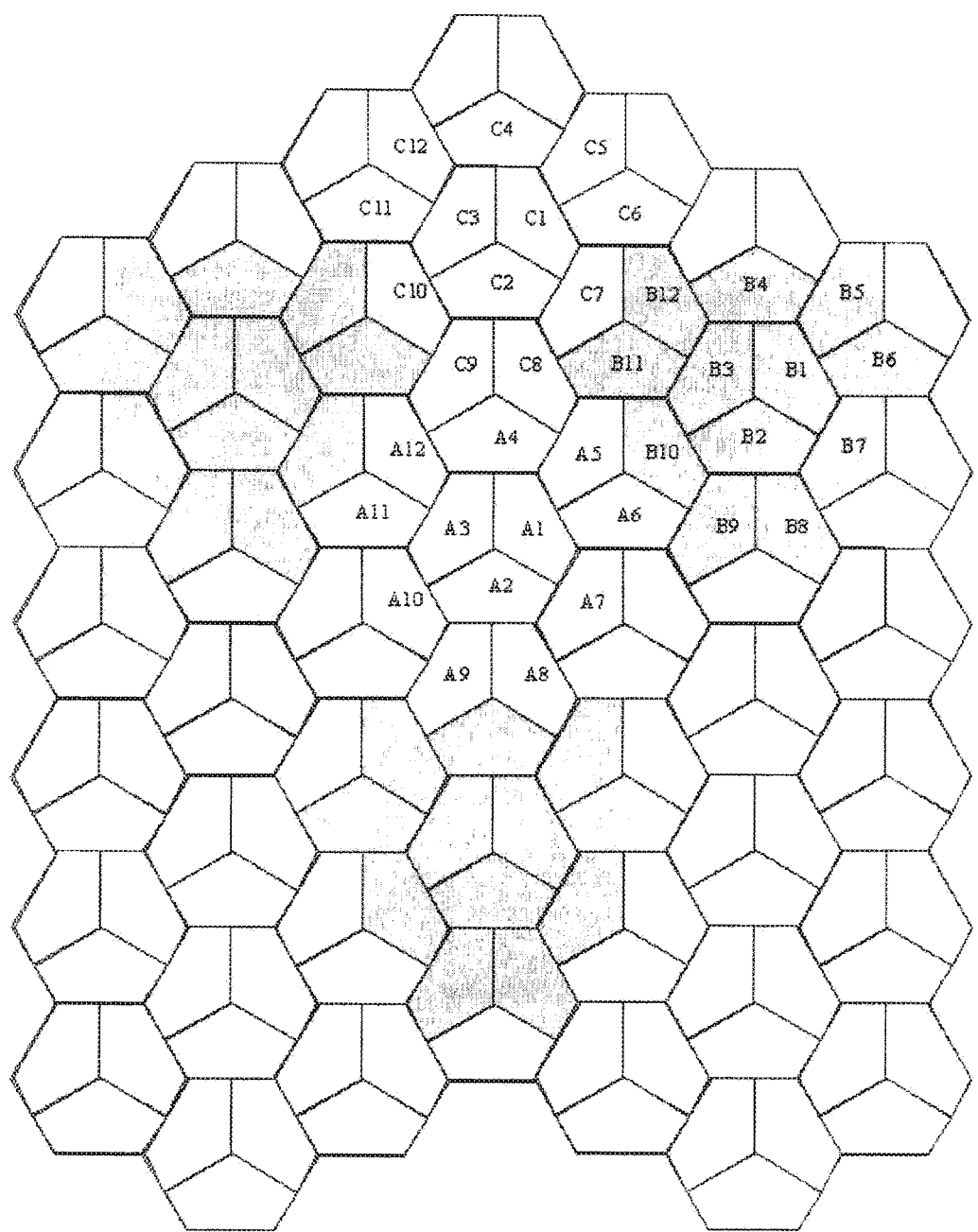
FIG. 5 is an illustration of an example network mapping showing many cells, with a subset of the cells being arranged in a CSI-RS group.

FIG. 5 is an illustration of an example network mapping showing many cells, with a subset of the cells being arranged in a CSI-RS group. In FIG. 5, cells sharing the same shading are members of the same CSI-RS group. For example, the cells labeled A1-A12 are members of a first CSI-RS group, while cells numbered B1-B12 are members of a second group. In this example, a homogeneous network is illustrate where the group size is 12 cells.

Different CSI-RS ports in different cells within a CSI-RS group may be configured to transmit mutually orthogonal or quasi-orthogonal CSI-RSs. In that case, orthogonality may be achieved by means of TDM and/or FDM of CSI-RS resources. For example, different REs within the same RB, or in different RBs within a subframe and/or in different subframes, may be used for different CSI-RS ports in different cells within the CSI-RS group and/or by code division multiplexing (CDM) where the CSI-RSs transmitted by different cells/CSI-RS ports are on the same set of REs but are modulated by different orthogonal or pseudo-orthogonal sequences; and/or cyclic shift multiplexing (CSM) where the CSI-RSs transmitted by different cells/CSI-RS ports are on the same set of REs but are cyclically shifted in the time domain by a delay larger than the channel delay profile; and/or by a combination of these techniques. TDM of CSI-RS REs can be done by transmitting the CSI-RS REs on different OFDM symbols within a subframe or by transmitting the CSI-RS REs on different subframes. FDM of CSI-RS REs can be done by transmitting the CSI-RS REs on different OFDM sub-carriers within a RB or across different RBs.

A fixed number ($N_{CSI-RS}$) of orthogonal CSI-RS port resources (in time and/or frequency and/or code domain and/or cyclically shifted domain) may be reserved for each CSI-RS group. The $N_{CSI-RS}$ could be semi-statically configured and changed from time to time. The $N_{CSI-RS}$ may be equal to or larger than the sum of the required CSI-RS port resources for the CSI-RS group. For example, if the group size is 12 and the number of CSI-RS port resources required per cell is 2 in the case of 2 transmit antennas in each cell, then the total number of required CSI-RS port resources for the group is 24. Each cell is allocated the required number of CSI-RS port resources within the set of $N_{CSI-RS}$ port resources. The CSI-RS port resources allocated to different cells within the group may vary. A group size of 12 is just an example; typical group sizes may be smaller, e.g. 6. In that case, if each cell requires 4 transmit antenna ports, the total number of required CSI-RS port resources for a group is 24.

Figure 6:
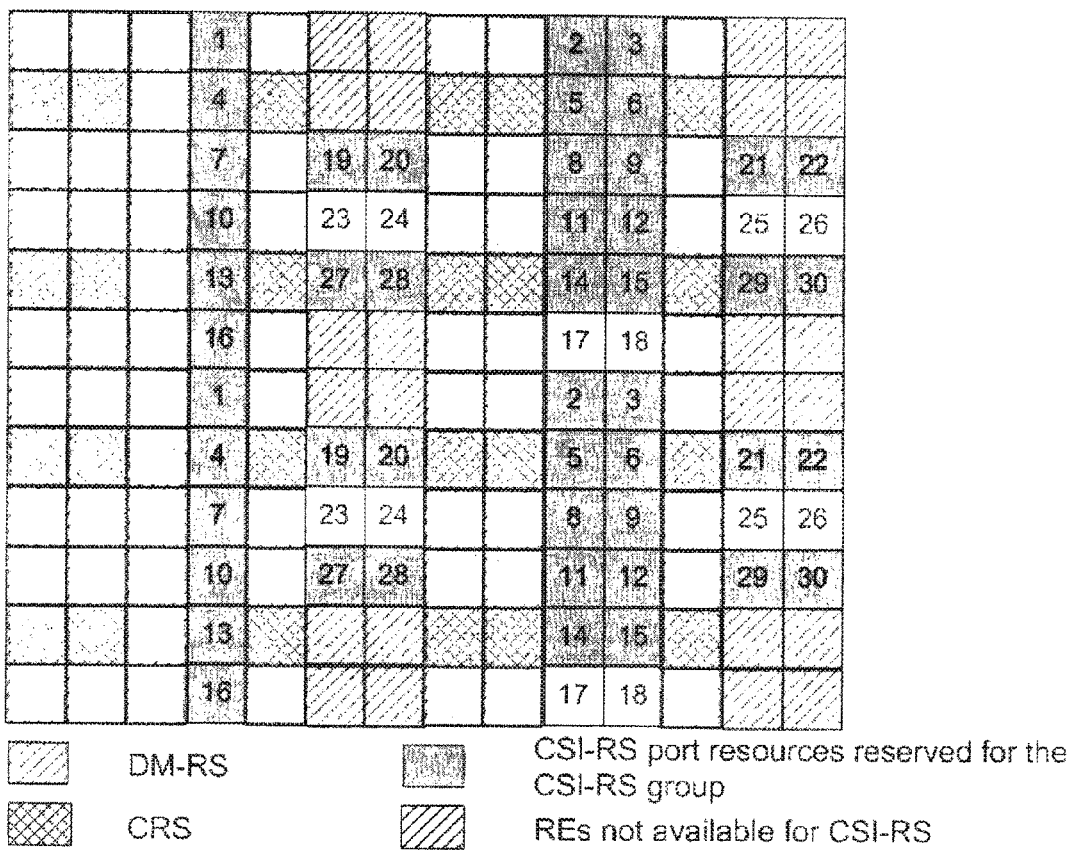
FIG. 6 is an illustration showing reservation of available REs in an RB for CSI-RS ports within a CSI-RS group.

FIG. 6 is an illustration showing reservation of available REs in an RB for CSI-RS ports within a CSI-RS group. As illustrated in FIG. 6, the $N_{CSI-RS}$ port resources reserved for the CSI-RS group is 48 REs (out of the maximum available REs for CSI-RS transmission of 60). In this example, each cell requires two CSI-RS ports corresponding to 4 REs in the subframe where the CSI-RS is transmitted and the CSI-RS group size is 12. A total of 48 available REs are reserved for CSI-RS transmission by cells within the CSI-RS group. For example, CSI-RS port resources #1 and #2 shown in FIG. 6 are used by cell A1 in the CSI-RS group (see cells A1-A12 in FIG. 5, for example); CSI-RS port resources #4 and #5 shown in FIG. 6 are used by cell A2 in the CSI-RS group (see cells A1-A12 in FIG. 5, for example), etc.

In addition to the reuse factor introduced for cells within a CSI-RS group proposed above, another level of reuse factor may be used across adjacent CSI-RS groups. Different adjacent CSI-RS groups may be allocated different and mutually exclusive/orthogonal sets of $N_{CSI-RS}$ orthogonal CSI-RS port resources. In this manner, the CSI-RS collision and interference between adjacent CSI-RS groups can be minimized. In the example shown in FIG. 5, a reuse factor of 3 is introduced as shown by the 3 different shadings used by different CSI-RS groups. In FIG. 5, CSI-RS groups having the same shading may use the same set of $N_{CSI-RS}$ orthogonal CSI-RS port resources. In some cases, different adjacent CSI-RS groups may use different but not fully mutually exclusive sets of $N_{CSI-RS}$ orthogonal CSI-RS port resources. Alternatively, the orthogonal resources used by different CSI-RS groups may not be fully orthogonal. In that case, for each orthogonal resource set that could be allocated to a CSI-RS group, there may be a multi-level score for other orthogonal resource sets such as "no interference", "less interference", "full interference", etc. When allocating the orthogonal resource sets to different CSI-RS groups, multiple levels of re-use factor could apply based on the scores.

Figure 7A:
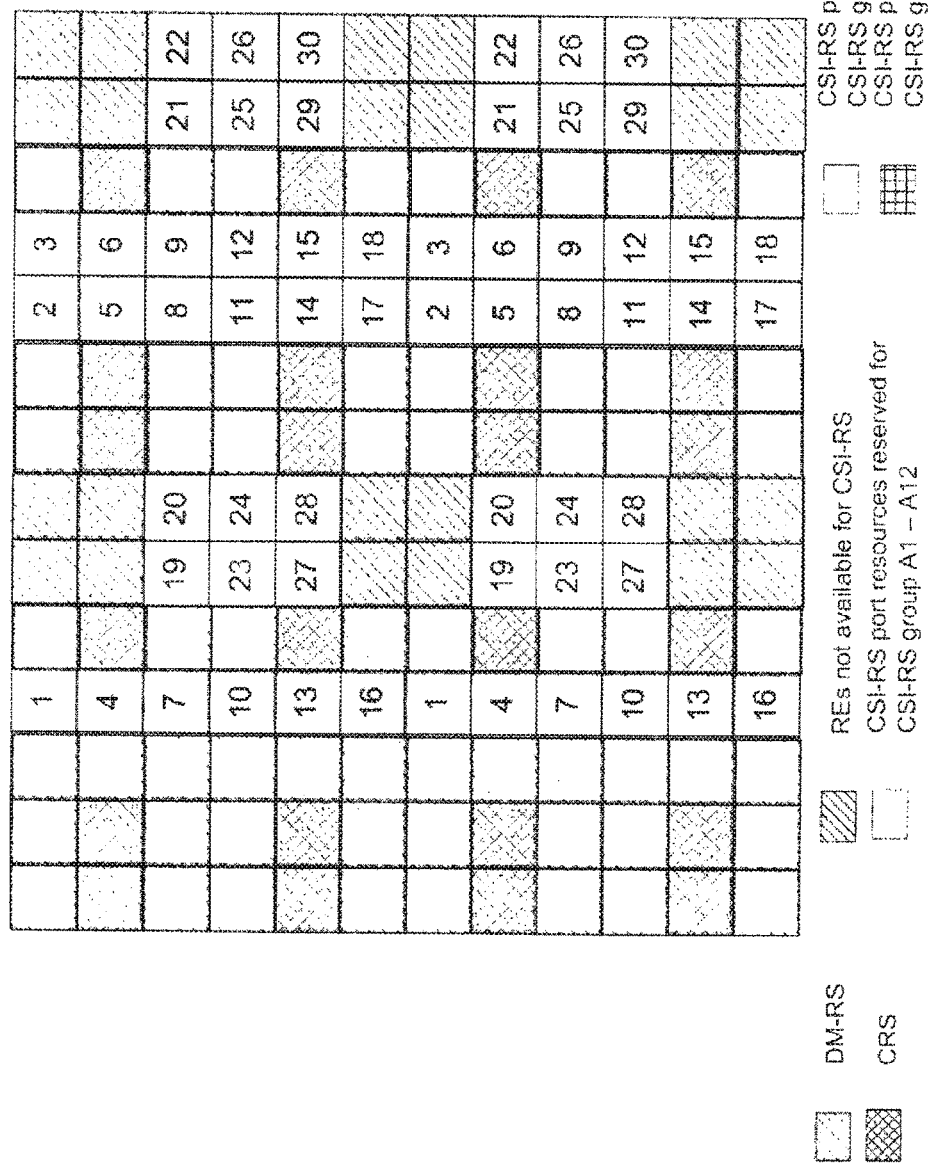
Figure 7B:
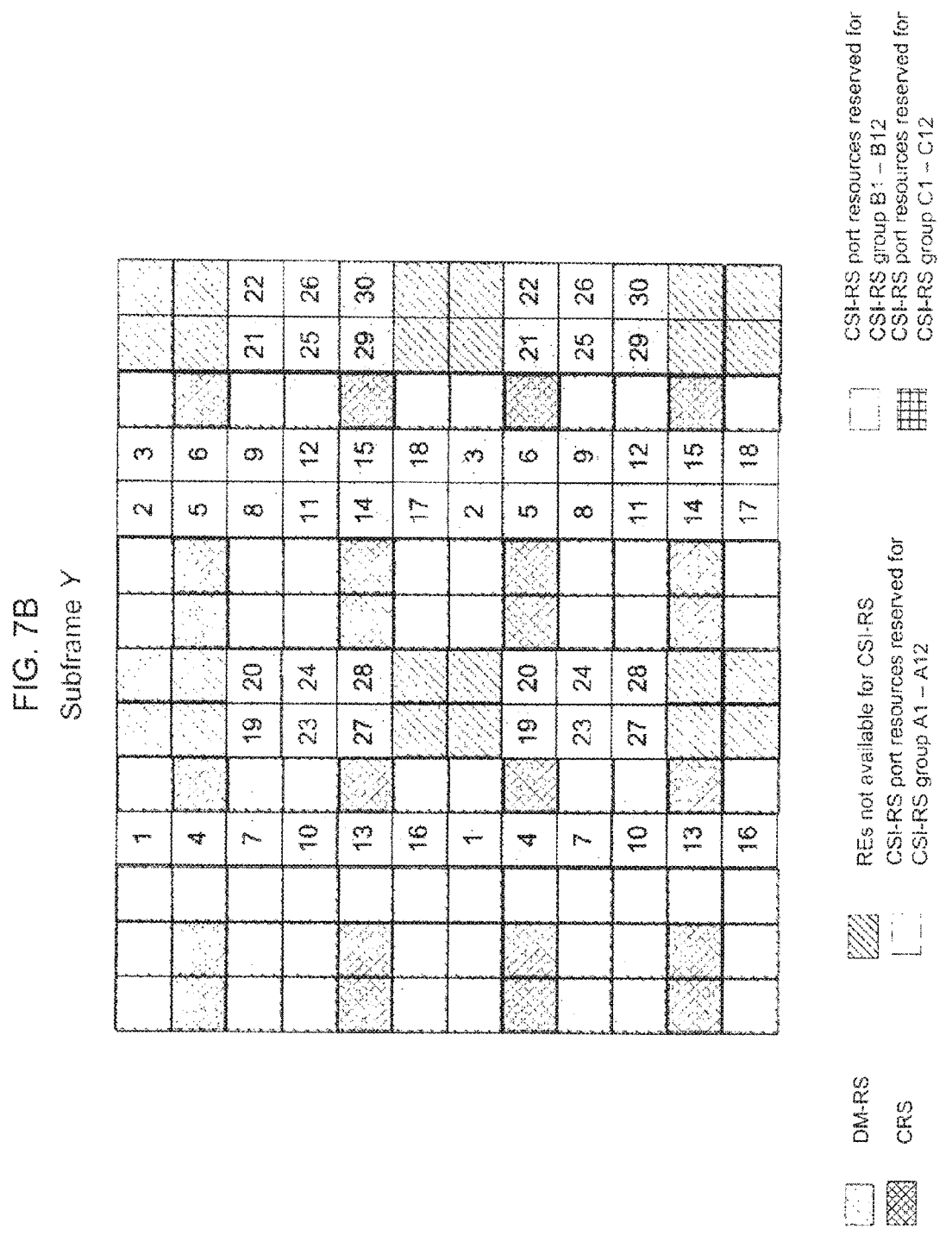
Figure 7C:
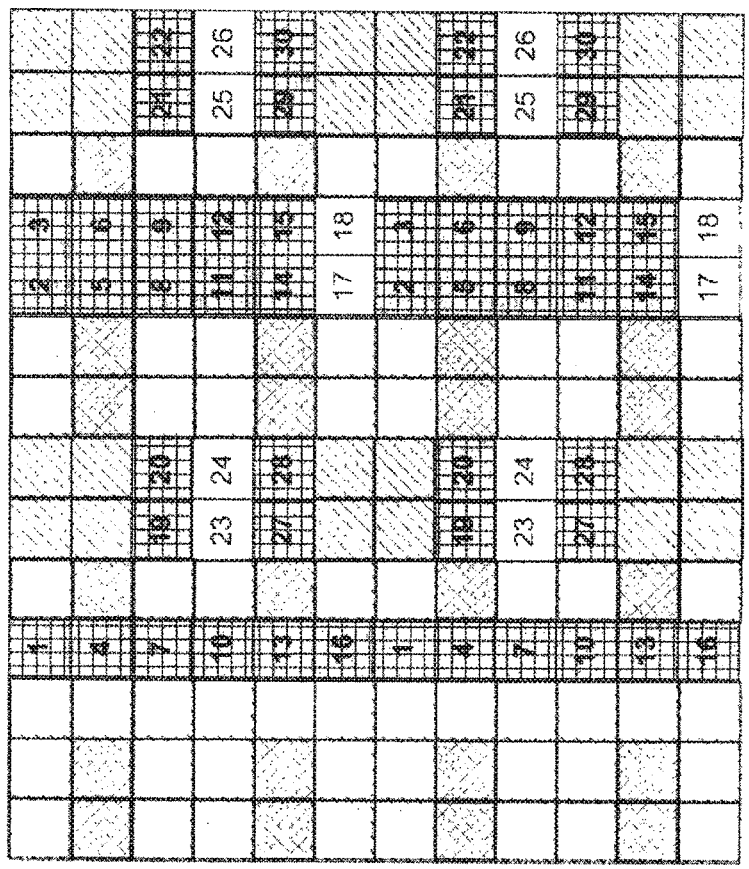

FIGS. 7A-7C illustrates 3 CSI-RS groups where different sets of mutually exclusive (or orthogonal) CSI-RS port resources reserved for different CSI-RS groups are provided using TDM. CSI-RS group #1 (e.g., cells A1-A12 on FIG. 5) accesses CSI-RS port resources that are reserved on subframe X (see FIG. 7A), while CSI-RS group #2 (e.g., cells B1-B12 on FIG. 5) accesses CSI-RS port resources that are reserved on subframe Y (see FIG. 7B), and CSI-RS group #3 (e.g., cells C1-C12 on FIG. 5) accesses CSI-RS port resources that are reserved on subframe Z (see FIG. 7C). Accordingly, each CSI-RS group is assigned a set of CSI-RS port resources being provided at different times.

Figure 8:
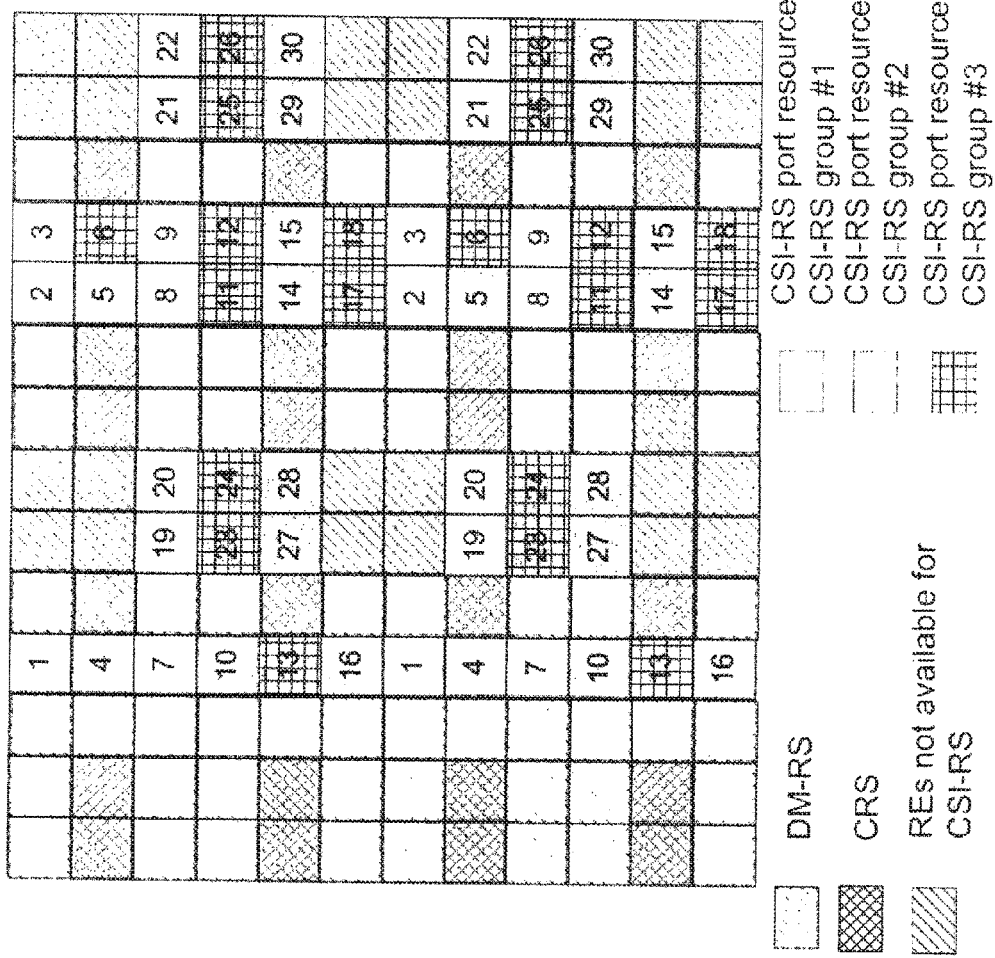
FIG. 8 is an illustration of multiplexing of mutual exclusive sets of CSI-RS port resources for different CSI-RS groups within a single RB.

FIG. 8 is an illustration of multiplexing of mutual exclusive sets of CSI-RS port resources for different CSI-RS groups within a single RB. Referring to FIG. 8, the CSI-RS group size is five cells and each cell requires resources for two CSI-RS ports which correspond to four REs in the subframe where the CSI-RS is transmitted. Therefore, each CSI-RS group needs to reserve 20 available REs for the CSI-RS. With a total of 60 available REs in an RB for CSI-RS transmission, mutually exclusive (or orthogonal) CSI-RS sets for three CSI-RS groups can be supported within an RB.

In general, mutually exclusive or orthogonal sets of CSI-RS port resources for different CSI-RS groups can be achieved through FDM, e.g different RBs within a subframe are used by different CSI-RS groups for CSI-RS transmission; or a combination of TDM and FDM across different subframes and RBs respectively; and different REs within an RB; or CDM fashion; or CSM fashion; or a combination of the above.

In some cases, hopping is performed where the CSI-RS resource corresponding to a CSI-RS port used by a particular cell hops from one CSI-RS resource to another over time, e.g., across different subframes where the CSI-RS is transmitted. The hopping of CSI-RS resources used for a CSI-RS port may be confined within the set of $N_{CSI-RS}$ resources reserved for the CSI-RS group. In some cases, all the cells within the same CSI-RS group use the same hopping sequence so that no collision of the used CSI-RS resources occurs. Accordingly, the objective of hopping is to randomize the inter-group CSI-RS collision and interference.

As described above, if a reuse factor is introduced for adjacent CSI-RS groups, the hopping sequence used for different groups within the reuse cluster can be different because mutually exclusive sets of $N_{CSI-RS}$ CSI-RS resources are reserved for different groups. For CSI-RS groups that use the same set of NCSI-RS CSI-RS resources (e.g., CSI-RS groups sharing the same shading as shown in FIG. 5), the hopping sequence used by different groups may be different to randomize CSI-RS collision and interference. For CSI-RS groups that use the partially identical NCSI-RS CSI-RS resources (i.e., partial orthogonal), the hopping sequence used by different groups may also be different.

Using the example shown in FIG. 8, where 10 CSI-RS port resources (corresponding to 20 REs) are reserved for each of CSI-RS groups #1, #2 and #3, FIGS. 9A and 9B are illustrations of the CSI-RS port resources mapping of CSI-RS group #1 over time. For CSI-RS group #1, as shown in FIG. 8, 10 CSI-RS port resources are reserved, i.e. those REs identified by 4, 5, 10, 14, 15, 16, 27, 28, 29 and 30 in FIG. 8. At a particular subframe A, for example, the mapping of CSI-RS ports of each cell (e.g., cells #1, #2, #3, #4, and #5) within the CSI-RS group #1 to the actual CSI-RS port resources is shown by the shaded boxes in FIG. 9A. At a second time, however, when the CSI-RS is transmitted (e.g., subframe B) the mapping of CSI-RS ports to the actual CSI-RS port resources changes to that shown by the shaded boxes in FIG. 9B. In FIG. 9B the mapping of CSI-RS ports of each cell to the actual CSI-RS port resources is shifted cyclically among the cells within the CSI-RS group #1. For example, in FIG. 9B (e.g. subframe B), cell #1 uses the CSI-RS port resources of cell #2 in FIG. 9A (e.g. subframe A); cell #2 in FIG. 9B (e.g. subframe B) uses the CSI-RS port resources of cell #3 in FIG. 9A (e.g. subframe A); and so on and so forth. Accordingly, in FIG. 9A cell #1 uses CSI-RS port resources 4 and 5. However, in FIG. 9B, cell #1 uses CSI-RS port resources 10 and 14 and resources 4 and 5 are used by cell #5.

The hopping of the resource mapping is coordinated among cells within the CSI-RS group such that different cells use mutually exclusive CSI-RS port resources. The same hopping sequence may be used for all cells within a CSI-RS group, with each cell being offset by a different and predefined offset value that corresponds to a logical ID associated with the cell. Different cells within a CSI-RS group have different logical IDs. In one specific implementation, the logical ID is the physical cell ID of the cell. Alternatively, the logical ID may be the logical cell ID of the cell. Different CSI-RS groups may have different hopping sequences that are randomized by the CSI-RS group ID. Note that the hopping of CSI-RS resource mappings above can be generalized to hopping over time (e.g., in terms of subframes) and/or over frequency (e.g., in terms of RBs).

Each cell in the CSI-RS group may be configured to mute the transmission of PDSCH REs that coincide with the CSI-RS REs transmitted by other cells within the CSI-RS group. This may result in a reduction of the level of interference generated to the CSI-RS of other cells within the CSI-RS group. Alternatively, a cell within the CSI-RS group may only mute the transmission of PDSCH REs that coincide with the CSI-RS REs transmitted by a subset of the cells within the CSI-RS group. In that case, the selection of the subset of cells may be based on the interference measurements observed. Note that the selection could be changed from time to time. Within the same CSI-RS group, multiple muting subsets could be possible for different cells in the CSI-RS group and different RBs. Generally, the subset of cells may include the strongest interfering neighbor cells.

Figure 10C:
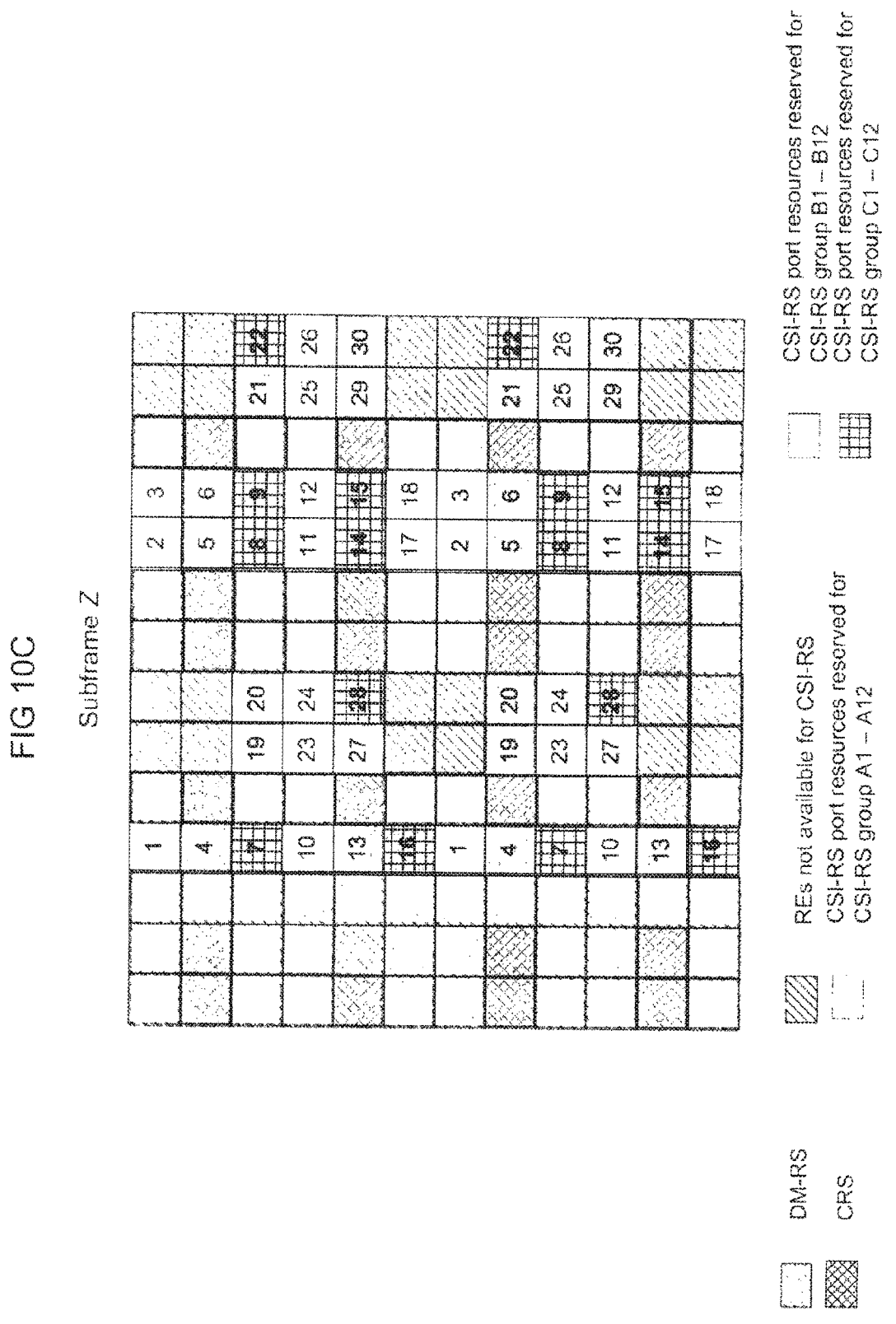

In the examples shown in FIG. 6 and FIGS. 7A-7C, each CSI-RS group requires 24 CSI-RS port resources (i.e., corresponding to 48 REs). As previously described, generally no more than 16, 24, or 32 Rel-8 PDSCH REs should be punctured or muted in order not to severely degrade the Rel-8 PDSCH performance. Therefore, in this case, it may be preferable to distribute the CSI-RS port resources reserved for a CSI-RS group over multiple subframes, for example across 3 subframes. As such, in each subframe 16 REs are used for CSI-RS. FIGS. 10A-10C are illustrations of different or mutually orthogonal CSI-RS port resources reserved for different CSI-RS groups where 8 CSI-RS port resources (i.e. 16 REs) are reserved for each CSI-RS group in each of the three subframes X (FIG. 10A), Y (FIG. 10B), and Z (FIG. 10C). Although in the example shown in FIGS. 10A-10C, the same REs locations are reserved for the same CSI-RS group over the three subframes, there may be alternative implementations where the REs locations reserved for a CSI-RS group are different across different subframes.

In the case that the muting of PDSCH REs is performed for REs that coincide with CSI-RS of neighbor cells within the CSI-RS group, there are cells at the boundary of a CSI-RS group that may experience or generate interference from/to neighbor cells in another CSI-RS group. To avoid interference, a cell may also mute the PDSCH REs that coincide with CSI-RS of neighbor cells in another CSI-RS group. This may lead to a further increase in the number of PDSCH REs that are punctured/muted within a subframe.

Alternatively, to avoid inter-CSI-RS group interference, the CSI-RS port resources across CSI-RS groups may be multiplexed using CDM or CSM. In that case, the same set of available REs within an RB/subframe are reserved for different CSI-RS groups. However, in the case of CDM, different orthogonal or pseudo-orthogonal sequences may be used to modulate the CSI-RS transmitted by cells in different CSI-RS groups. To ensure orthogonality, the REs used for a CSI-RS port may be adjacent to one another. In the case of CSM, different time domain cyclic shift delays may be applied to the CSI-RS transmitted by different CSI-RS groups.

In some cases, the present implementation may be extended in the case of a network implementation including a deployment of one or more small cells. As such, the muting of PDSCH REs may correspond to CSI-RS port resources transmitted by both macro cells and small cells (i.e. CSI-RS subgroups) within the CSI-RS groups.

Alternatively, each cell may maintain a listing of strongest interfering neighbor cells. The listing may be at least partially included as part of the CoMP measurement set of a UE served by these cells. The list can consist of cells within the same CSI-RS group as the cell of concern and/or cells in different CSI-RS groups. The CoMP measurement set of a UE is the set of neighbor cells for which a UE measures the CSI using the CSI-RS transmitted by the corresponding neighbor cells. To reduce interference to the CSI-RS transmitted by the list of strongest interfering neighbor cells, the transmission of PDSCH REs by this cell that coincide with the CSI-RS REs transmitted by the strongest neighboring cells within the list, may be muted.

The list of strongest interfering neighbor cells of a cell can be constructed semi-statically by the network through, for example, RF planning or slowly adapting the listing based upon long term observation of UEs' measurement reports or feedback such as RSRP/RSRQ report, CQI report, etc.

In some cases, the present system may be extended in the case of a network implementation including a deployment of one or more small cells. As such, the interfering neighbor cells of a cell (either macro cell or small cell) include both interfering macro cells as well as overlaid small cells.

When implementing the present system, to decode received PDSCH transmissions, and to detect the CSI-RSs transmitted by the UE's serving cell and neighbor cells in the UE's CoMP measurement set, a UE may need to have information related to the CSI-RS ports transmitted by the UE's serving cell, the CSI-RS ports transmitted by neighbor cells in the UE's CoMP measurement sets and the PDSCH REs that are muted. There are several mechanisms or processes that a eNB and/or UE may implement in order for the UE to determine the necessary information.

First, the physical location of REs available for potential CSI-RS transmission within an RB may be predefined in a specification or broadcast in a system information block (SIB). In the example shown in FIG. 6, there are a total of 60 REs available and their locations may be predefined or communicated to one or more UEs using a system information block (SIB).

Each available RE (and possibly CDM sequence or CSM cyclic shift delay) is indexed by a number to associate the available RE and/or CDM sequence and/or CSM cyclic shift delay with the CSI-RS port resource. The numbering may be predefined in a specification or broadcast in an SIB. In the example shown in FIG. 6, there are 30 numbered CSI-RS port resources. Each CSI-RS port resource in the example corresponds to two REs. Each CSI-RS port resource can be used for CSI-RS transmission for a CSI-RS antenna port. A larger number of CSI-RS port resources can be defined if full orthogonality between CSI-RS port resources (e.g. in FDM, TDM, CDM or CSM domain) does not need to be maintained.

The CSI-RS port resources (and their corresponding subframes and RBs within those subframes) reserved for a CSI-RS group and the CSI-RS group ID may be signaled by each cell within the CSI-RS group to the UEs served by the cell. The signaling may be broadcast through an SIB or sent via dedicated signaling to each UE. In the example shown in FIG. 8, the CSI-RS port resources reserved for CSI-RS group #1 are indexed by 4, 5, 10, 14, 15, 16, 27, 28, 29 and 30. In addition, the subframe numbers (within a radio frame) and RBs within those subframes where the corresponding CSI-RS port resources are reserved may also be signaled to the UEs. If CSI-RS port resources hopping is employed within the CSI-RS group, a set of reserved CSI-RS port resources for the CSI-RS group will change from one subframe and/or RB to another. The hopping sequence based on subframe number and/or RB number can be predefined in the specification.

The CSI-RS port resources reserved for a CSI-RS group may be mapped to certain logical CSI-RS port resource indices as shown in FIG. 11. The signaling of the mapping may be implicit such that the CSI-RS port resources assigned for the CSI-RS group are ordered according to their logical indices in the broadcast or dedicated signaling message (e.g. a Radio Resource Control (RRC) message). Alternatively, the logical indices may be assigned implicitly based upon incremental values of the assigned CSI-RS port resource indices. Alternatively, the mapping of CSI-RS port resources to logical CSI-RS port resource indices are explicitly indicated in the broadcast or dedicated signaling sent by a serving cell to the cell's UEs.

The logical CSI-RS port resource indices may be used for mapping CSI-RS ports of each cell to the actual REs used for the CSI-RS transmission. For example, as shown in FIG. 11, logical CSI-RS port resources #1 and #2 are assigned to cell A1, logical CSI-RS port resources #3 and #4 are assigned to cell A2 and so on. The mapping of CSI-RS ports of a cell to the logical CSI-RS port resources can be based on the logical ID assigned to a cell within the CSI-RS group based on a predefined mapping rule defined, for example, in a specification. In one implementation, the logical ID is the same as the physical cell ID (PCI).

If CSI-RS hopping is enabled, the mapping of CSI-RS ports of a cell to the logical CSI-RS port resources can be based on the logical ID assigned to a cell within the CSI-RS group and the subframe and/or the RB on which the CSI-RS is transmitted, based on a predefined mapping rule defined, for example, in a specification. The same hopping sequence for CSI-RS ports to logical CSI-RS port resources mapping may be used for all the cells within the CSI-RS group, with each cell being offset by a different and predefined offset value that corresponds to a logical ID associated with each cell. In one implementation, the hopping sequence associated with a CSI-RS group may be defined based on the CSI-RS group ID.

A UE may be signaled by the UE's serving cell (via broadcast or dedicated signaling such as RRC signaling) with the logical ID associated with the UE's serving cell and the number of CSI-RS ports that the UE's serving cell transmits (which corresponds to the number of transmit antennas of the UE's serving cell). Based upon the logical ID and the information described above, the UE can derive the CSI-RS port resources used for CSI-RS transmission by the UE's serving cell. In one implementation, the logical ID is the same as the physical cell ID (PCI). In this case, the UE may derive the PCI from the synchronization channel, for example.

A UE in CoMP operation may also be signaled by the UE's serving cell (via broadcast or dedicated signaling such as RRC signaling) with the following information of each neighbor cell in the UE's CoMP measurement set. If the neighbor cell is in a different CSI-RS group (i.e., a neighbor CSI-RS group), and a reuse factor is introduced across CSI-RS groups (as discussed above), the following information of the neighbor CSI-RS group may be signaled: 1) CSI-RS port resources (and their corresponding subframes and RBs within those subframes) reserved for the neighbor CSI-RS group; 2) the mapping of the reserved CSI-RS port resources to logical CSI-RS port resource indices; and 3) CSI-RS group ID. Additional information to be signaled may include a logical ID associated the neighbor cell, and the number of CSI-RS ports that the neighbor cell transmits or specific CSI-RS ports of the neighbor cell that the UE should measure the CSI.

Based upon this information, the UE can derive the CSI-RS port resources used for CSI-RS transmission by each neighbor cell and therefore measure and report the CSI of specific CSI-RS ports in each neighbor cell in the UE's CoMP measurement set.

A UE may also be signaled with the logical IDs or PCI and number of CSI-RS ports (or specific CSI-RS ports) associated with a list of neighbor cells within the same CSI-RS group as the UE's serving cell so that the UE can derive which PDSCH REs transmitted by the UE's serving cell are muted based on the CSI-RS port resources transmitted by the list of neighbor cells. In addition, a UE may also be signaled the following information of a list of neighbor cells in a different (or neighbor) CSI-RS group in order to derive which PDSCH REs transmitted by the UE's serving cell are muted based on the CSI-RS port resources transmitted by this list of neighbor cells: If reuse factor is introduced across CSI-RS groups (as discussed above), the following information of the neighbor CSI-RS group may be signaled: 1) CSI-RS port resources (and their corresponding subframes and RBs within those subframes) reserved for the neighbor CSI-RS group; 2) the mapping of the reserved CSI-RS port resources to logical CSI-RS port resource indices; and 3) CSI-RS group ID. Additional information may include a logical ID associated with the neighbor cell, and the number of CSI-RS ports (or specific CSI-RS ports) the neighbor cell transmits.

The following procedures allow a UE to acquire information related to CSI-RS and number of antenna ports of its serving cell. Similar to LTE Rel-8, an LTE-A UE in Idle mode decodes the Physical Broadcast Channel (PBCH) to read the Master Information Block (MIB) of the UE's (re)selected cell. The UE obtains the antenna configuration of the cell used for transmitting CRS, common control channels (e.g. PDCCH, PCFICH, PHICH etc.) and PDSCH carrying SIBs through blind decoding and CRC de-masking of the PBCH using hypothesis of 1tx, 2tx or 4tx configurations. While entering RRC_Connected mode, or while in RRC_Connected mode, the UE may acquire information related to the CSI-RS of the UE's serving cell as previously described through the decoding of SIB carried in the PDSCH. The CSI-RS information of the serving cell can be included in a new SIB introduced for LTE-A or in one or more new information elements (IEs) introduced in existing SIBs. A UE in RRC_Connected mode may be further signaled by the UE's serving cell the number of CSI-RS ports (or specific CSI-RS ports) and the neighbor cells for which the UE should measure/report the CSI and CQI. This may be associated with the transmission mode configured for the UE.

In some cases, the CSI-RS is only transmitted in an MBSFN subframe or in a subset of the MBSFN subframes. One or more MBSFN subframes can be defined within a radio frame where the CSI-RS is transmitted. Alternatively, the CSI-RS is only transmitted in an LTE-A subframe, which is a subframe that only supports LTE-A UEs. The previously described concepts of CSI-RS port resources, CSI-RS groups, reuse factor across CSI-RS groups, and muting of PDSCH REs may be applied in this implementation.

Figure 12:
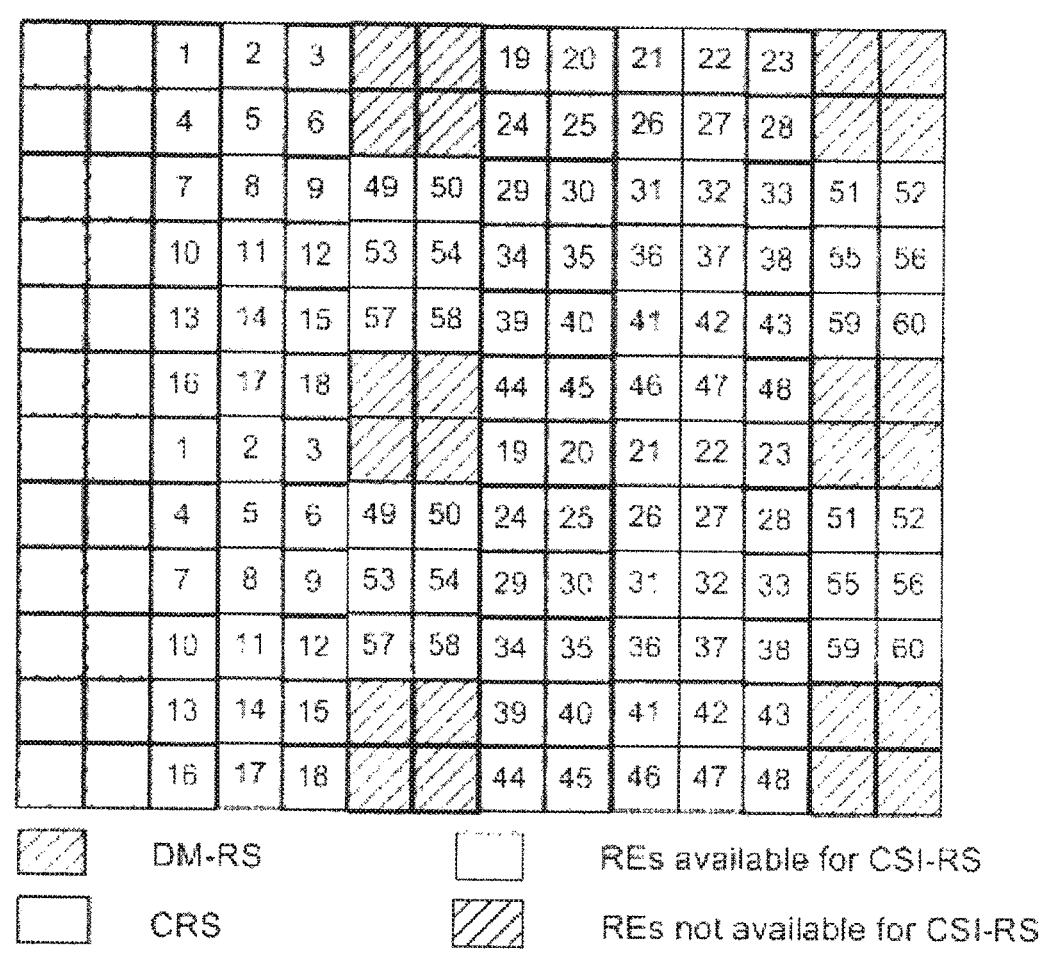

Because legacy Rel-8 UEs only decode the first two symbols of an MBSFN subframe for PDCCH information, the remaining symbols in an MBSFN subframe may not need to transmit the Rel-8 CRS. Accordingly, the number of available REs within the MBSFN subframe becomes larger. FIG. 12 is an illustration of available REs in an RB for CSI-RS in a MBSFN subframe. As shown in FIG. 12, the number of available REs for CSI-RS is 120 corresponding to 60 CSI-RS port resources in the case where each CSI-RS port resource corresponds to two REs. As the overhead of CRS is reduced, i.e. 16 CRS REs are no longer needed in an MBSFN subframe, some of the available RE resources can be used for CSI-RS purposes, i.e. either for CSI-RS transmission or muting of PDSCH REs.

One or more specific MBSFN subframe within a radio frame or within multiple radio frames may be used for CSI-RS transmission only without PDSCH transmission. The special MBSFN subframe may be used by all cells in the CSI-RS group or all cells in the network for CSI-RS transmissions.

In some cases, the CSI-RS group, reuse factor across CSI-RS groups, hopping of CSI-RS, and PDSCH REs muting concepts are only applied to a subset of CSI-RS ports transmitted by each cell. For example, if each cell transmits a total of 8 CSI-RS ports, only N (where N<8) of the CSI-RS ports may be implemented in accordance with the concepts described above. For example, only N CSI-RS port resources used by each cell may be orthogonal to those used by neighbor cells within the CSI-RS group. The reuse factor can be introduced across CSI-RS group and the hopping of CSI-RS port resources may be applied to only N CSI-RS ports in each cell. The muting of PDSCH REs of a cell may only be applied to those REs that coincide with the CSI-RS port resources of the N CSI-RS ports of neighbor cells. In some cases, the subset of N CSI-RS ports are those that are used for CoMP purposes. The remaining (8-N) CSI-RS ports of each cell may occupy CSI-RS port resources that are not orthogonal to each other or partially orthogonal to each other.

In some cases, the muting of specific PDSCH REs is applied to all RBs transmitted by a cell either based on CSI-RS grouping or based on a strongest interfering neighbor cell list. However, because muting degrades the PDSCH performance of legacy UEs, it may be better that not all RBs within the system bandwidth are affected by muting.

Figure 13:
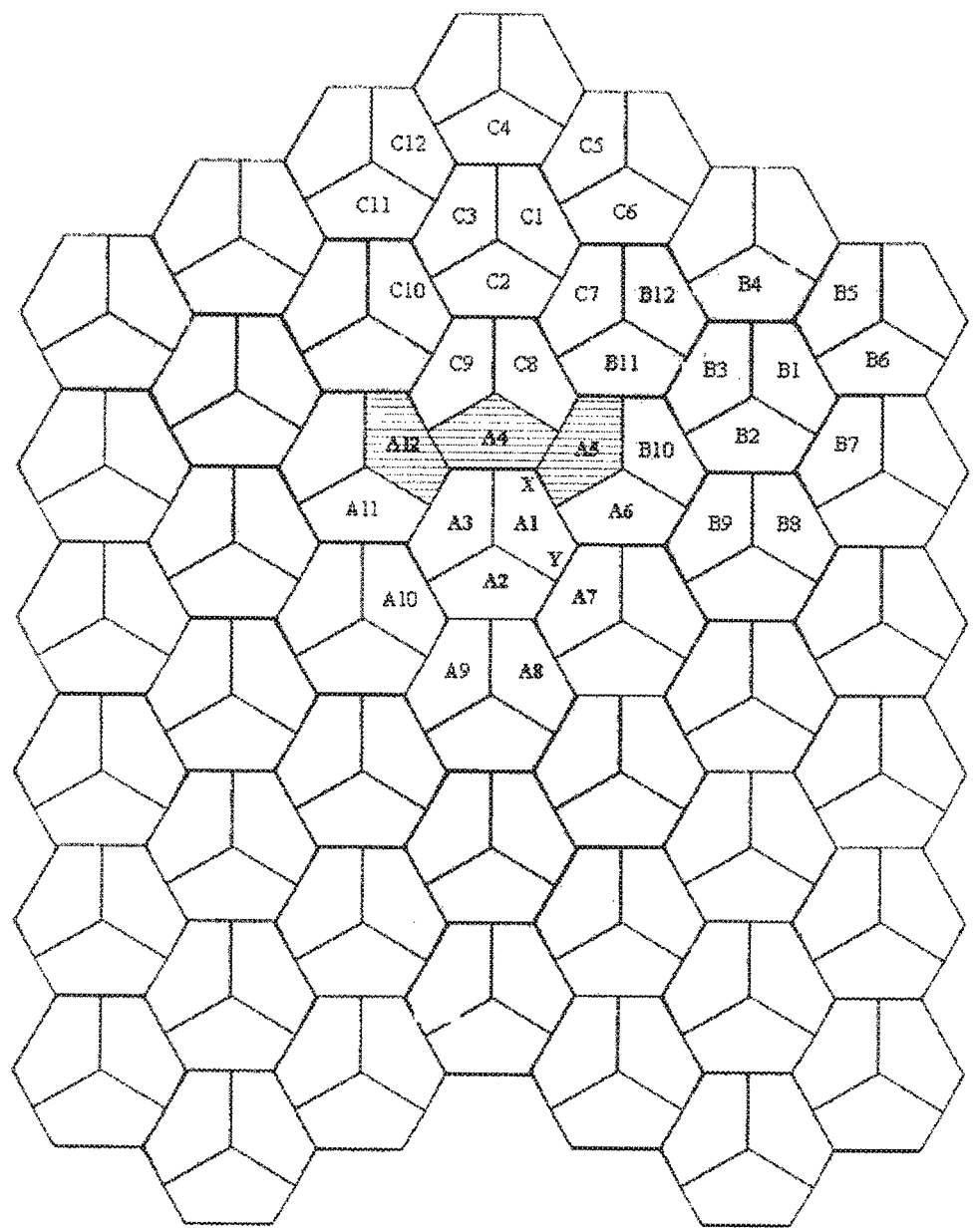
FIG. 13 is an illustration of a CSI-RS grouping within a network showing the strongest neighbor cells to UEs at different location within the cell.

For UEs that are closer to the cell center where CoMP is not applied, there may be no need for those UEs to measure the neighbor cells' CSI-RS. Therefore, muting of PDSCH REs may not provide any benefit to those UEs. On the other hand, for UEs that are closer to the cell edge, the list of strongly interfering neighbor cells may be different for different UEs' location. FIG. 13 is an illustration of a CSI-RS grouping within a network showing the strongest neighbor cells to UEs at different location within the cell. Referring to FIG. 13, within cell A1, a first UE is located at the location marked by 'X' while a second UE is located at the location marked by 'Y'. It can be seen that for the UE located at 'X', the likely strong interfering neighbor cells are cells A12, A4 and A5. For the second UE located at 'Y', the likely strong interfering neighbor cells are cells A6, A7, A2, and A8. Although the CSI-RS group size may still be 12 as shown in this example where the cells within the group transmit mutually orthogonal CSI-RSs as discussed above, the muting does not need to occur for PDSCH REs that coincide with the REs of CSI-RS transmitted by all the 12 cells within the group. The muting of PDSCH REs may only be necessary for those REs that coincide with the CSI-RS transmitted by the strong neighbor cells and within those RBs that are used by the UEs of concern to measure the CSI-RS of the strong neighbor cells.

Figure 14:
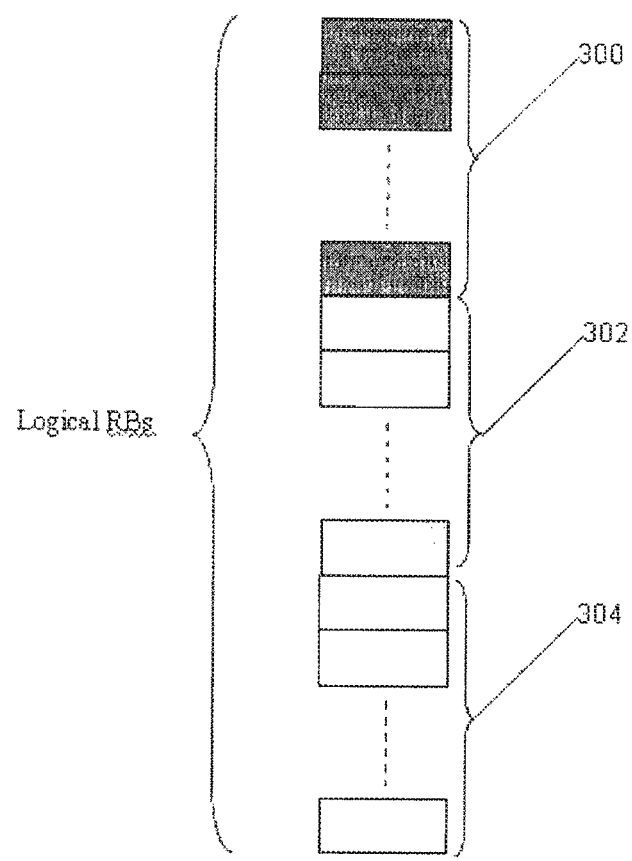
FIG. 14 is an illustration of RBs based on PDSCH REs muting requirements, the RBs within each RB group can be contiguous or non-contiguous.

To avoid unnecessary muting, the RBs transmitted by a cell within the system bandwidth may be divided into different RB groups. A particular RB group may be identified by a base station and the identity of the RB group may be transmitted to a UE. For the CSI-RS groups shown in FIG. 13, for example, the available RBs may be partitioned into three RB groups as shown in FIG. 14. FIG. 14 is an illustration of RBs based on PDSCH REs muting requirements. The RBs within each RB group can be contiguous or non-contiguous. In this example, the first group of RBs 300 is used for PDSCH transmission to cell center UEs that do not require CoMP. Because cell-center UEs do not need to measure the CSI-RS of neighbor cells, no muting of PDSCH REs is required for the first group of RBs 300. The first group of RBs 300 can also be used for PDSCH assignment to legacy Rel-8 UEs because the impact caused by CSI-RS transmission will be reduced.

The second group of RBs 302 is used for PDSCH transmission to cell edge UEs that require CoMP and are located at the cell edge region such that cells A4, A5, A12 are the strong interfering neighbor cells (e.g., for transmissions to UEs at location X). In that case, muting is done on the PDSCH REs that coincide with the CSI-RS transmitted by those neighbor cells.

The third group of RBs 304 is used for PDSCH transmission to cell edge UEs that require CoMP and are located at the cell edge region such that cells A2, A6, A7, A8 are the strong interfering neighbor cells (e.g., for transmissions to UEs at location Y). In that case, muting is done on the PDSCH REs that coincide with the CSI-RS transmitted by these neighbor cells.

The implementation illustrated in FIG. 14 may be generalized to define different numbers of RB groups within a cell where each group has a unique set of PDSCH REs that are muted to avoid interference caused to the CSI-RS transmitted by a set of strong interfering neighbor cells. In that case, each RB group may be targeted for specific groups of UEs that observe a specific set of strong interfering neighbor cells. The RB group described above can also be applied to the time domain or time domain plus frequency domain where different RB groups can be defined across different subframes with different periods of occurrence. Different CSI-RS power boosting levels can be applied to different RB groups to improve the serving and neighbor cells' CSI-RS detection reliability. For example, the first RB group used to serve cell center UEs may not require CSI-RS power boosting, i.e. the power boosting level is set to 0 dB. The second and third RB groups (e.g., groups 302 and 306) which are used to serve cell edge UEs may be configured with the same or different power boosting levels greater than 0 dB.

To reduce complexity and to reduce the impact to scheduling efficiency, the number of RB groups may be kept relatively small. In one example, both UE1 and UE2 are served by cell A1. UE1 has cell A2 and cell A3 as strong interfering neighbor cells while UE2 only has cell A2 as a strong interfering neighbor cell. Although UE1 and UE2 may be grouped into separate RB groups, to reduce the number of different RB groups, UE1 and UE2 can be grouped into the same RB group which defines neighbor cell A2 and cell A3 as strong interfering neighbor cells for both UE1 and UE2. In that case, the PDSCH REs within each RB of the RB groups that coincide with the CSI-RS transmitted by cell A2 and cell A3 may be muted. Although this incurs unnecessary muting overhead for UE2, it reduces the number of RB groups that need to be defined for a particular cell, thus reducing the impact on scheduling efficiency. Alternatively, for simplicity, the number of RB groups may be set to only 2, with a first group being reserved for non-CoMP UEs and a second group being reserved for CoMP operation. Note that different cells or subset of cells may have different configurations.

In this implementation, a UE may be configured to report CQI and CSI of one or more assigned RB groups. The CQI and CSI reporting configured for a UE on each assigned RB group can be the average CQI/CSI across all the RBs in the RB group and/or the CQI/CSI of certain preferred sub-bands (where each sub-band consists of a number of adjacent RBs) within the RB group. A UE may also be configured to report the wideband and/or sub-band CQI/CSI of one or more preferred RB groups among the assigned RB groups or report the preferred sub-bands among all of the assigned RB groups.

In some cases, the system may be extended in the case of a network implementation including a deployment of one or more small cells. As such, the set of strong interfering neighbor cells that define the PDSCH REs muting within an RB group may include both neighboring macro cells as well as overlaid small cells.

Because the muting or non-muting of specific PDSCH REs transmitted from a cell may affect the level of interference caused to the CSI-RSs of neighbor cells, the RB grouping may be coordinated among neighboring cells such that the same group of RBs are used to serve the set of UEs in neighboring cells that are observing the same set of strong interfering cells plus their serving cell. Using the example of three RB groups illustrated in FIG. 14, RB group 300 may be used to serve cell center UEs that do not use CoMP. This same group of RBs can be used by each neighboring cell to serve its own cell center UEs in the same manner. Accordingly, even though there is no muting of PDSCH REs in those RBs, there is no impact on the CSI-RS detection of these cell center UEs in the various neighboring cells. As an example, for RB group 302, cells A1, A4, A5, and A12 of FIG. 13 may be defined as mutually interfering cells associated with RB group 302. RBs defined for RB group 302 may be used by each of the mutually interfering cells to serve their UEs that have a list of serving cell plus strong interfering cells that includes cells A1, A4, A5, and A12 of FIG. 13. Each mutually interfering cell may perform PDSCH RE muting for REs that coincide with the CSI-RS of the other mutually interfering cells. Similarly, for RB group 304, the associated mutually interfering cells are A1, A2, A6, A7, and A8. RBs defined for RB group 304 may be used by each of the mutually interfering cells to serve the cell's UEs that have a list of serving cell plus strong interfering cells that includes cells A1, A2, A6, A7, and A8.

In accordance with the present implementation, one or more RB group is defined for each cell. The set of RBs reserved for a first RB group may be mutually exclusive from the set of RBs reserved for another RB group. Each RB group has an associated list of mutually interfering cells. The list of mutually interfering cells associated with an RB group may be called the CSI-RS muting group. Each of the mutually interfering cells within the CSI-RS muting group uses the RBs reserved for the corresponding RB group to serve its own UEs that observe strong interference from the cells within the CSI-RS muting group excluding the UE's serving cell. Each of the cells within the CSI-RS muting group may then perform PDSCH RE muting on REs that coincide with the CSI-RS transmitted from other cells within the CSI-RS muting group. Each of the cells within the CSI-RS muting group may be configured to apply a certain pre-configured power boosting level to the CSI-RS transmission. The power boosting level may be set to be the same among all the cells or different for different cells.

To reduce the number of RB groups that need to be defined for a cell in order to reduce the impact on scheduling efficiency, UEs that observe different strong interfering neighbor cells can be grouped together and served by the same RB group. For example, an RB group may be associated with a first, second and third cell as mutually interfering cells. UE1 and UE2 are served by the first cell. UE1 observes the second and third cells as strong interfering cells and therefore is served by this RB group. UE2 observes only the second cell as a strong interfering cell. In this example, however, UE2 can also be served by this RB group. This introduces unnecessary muting of PDSCH REs for UE2, but avoids adding another RB group to define the first and second cell as mutually interfering cells.

In some cases, the present system may be extended in the case of a network implementation including a deployment of one or more small cells. As such, the CSI-RS muting group may consist of mutually interfering macro cells as well as overlaid small cells within the mutually interfering macro cells. To reduce the number of PDSCH REs that needs to be muted, small cells that are located in the coverage area of different macro cells within the CSI-RS muting group can be assigned the same CSI-RS port resources.

A cell or base station can identify a listing of strong interfering cells observed by an UE using the UE's measurement report (e.g., an RSRP or RSRQ report) or a combination of measurement reports received from other UEs. Based upon the RSRP/RSRQ report from the UEs served by the cell, and through coordination with neighbor cells, a cell can determine the number of RB groups to be constructed, the interfering neighbor cells associated with each RB group, and the number of RBs assigned to each RB group. The configuration may be updated from time to time. In some cases, a cell coordinates with the cell's neighboring cells to determine the RB grouping. The grouping may also depend upon the number of users involved in the CoMP set, traffic loading situations, or neighboring cell loading conditions, etc.

Based upon the RSRP/RSRQ report received from one or more UE, the cell determines the RB group to which the UE should be assigned. For example, a UE may be assigned to an RB group where the UE's CoMP measurement set is a subset of the interfering neighbor cells associated with the RB group. Alternatively, a UE can be assigned multiple RB groups to allow better resource multiplexing among UEs served by the cell and overall scheduling efficiency.

In addition to the use of signaling to indicate the CSI-RS transmitted by the serving cell, the CSI-RS transmitted by neighbor cells in the CoMP measurement set and the muted PDSCH REs to the UE, additional signaling may be used to assign one or more RB groups to the UE in addition to corresponding PDSCH REs muting of an assigned RB group. For example, the following information associated with an RB group may be signaled to the UE (e.g., using an SIB broadcast or dedicated RRC signaling). The set of RBs belonging to an RB group—the set may be contiguous, non-contiguous, or a combination of both. The PDSCH REs within the set of RBs that are muted. The UE may be signaled with the logical IDs and number of CSI-RS ports (or specific CSI-RS ports) associated with a list of neighbor cells (called interfering cell group) within the CSI-RS muting group associated with the RB group so that the UE can derive which PDSCH REs transmitted by its serving cell within the RB group are muted based on the CSI-RS port resources transmitted by this list of neighbor cells. In one implementation, the UE's CoMP measurement set is a subset of the above-mentioned list of neighbor cells. Finally, the UE may be signaled with the power boosting level for CSI-RSs transmitted by cells in the CSI-RS muting group associated with the RB group.

If the above information related to an RB group is broadcast to the UE, the UE may be separately assigned or de-assigned an RB group via dedicated signaling (e.g. dedicated RRC signaling). Alternatively, dedicated signaling (e.g. dedicated RRC signaling) can be used to assign/de-assign an RB group to or from the UE and at the same time provide the above information associated with an assigned RB group to the UE.

In the case of a heterogeneous network, small cells may be located within the coverage areas of macro cells. In that case, the CSI-RS transmitted by a small cell may be orthogonal to the CSI-RS transmitted by the macro cell within which the small cell is located as well as the CSI-RS transmitted by other interfering macro and small cells.

Figure 15:
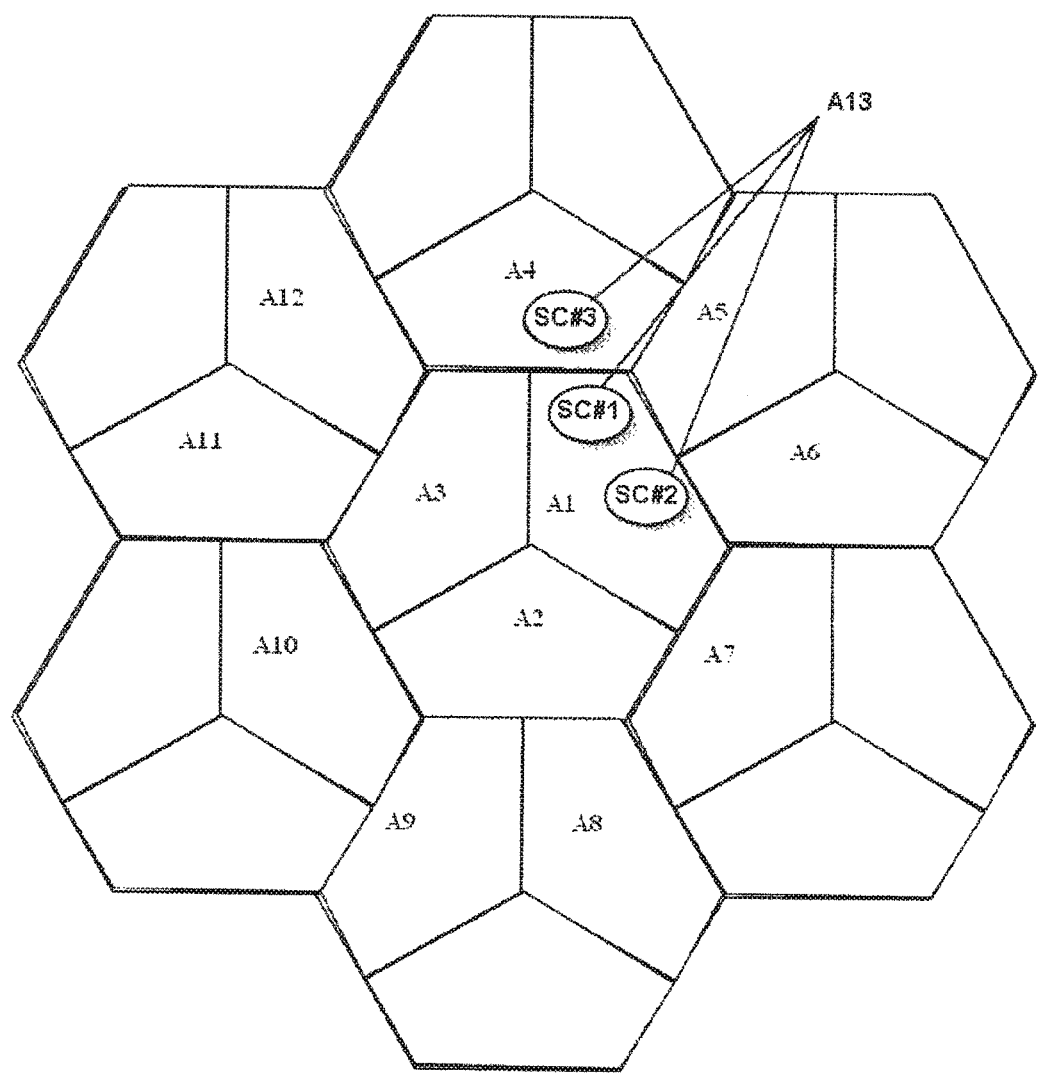
FIG. 15 is an illustration of an example network including several macro cells with small cells #1, #2, and #3 disposed within the macro cells.

Due to the low transmit power of small cells, the coverage of small cells may not overlap. FIG. 15 is an illustration of an example network including several macro cells with small cells #1, #2, and #3 disposed within the macro cells. As shown in FIG. 15 macro cells A1 and A4 may interfere directly with small cells #1, #2, and #3. Additionally, surrounding macro cells may also interference with small cells #1, #2, and #3. However, because the small cells do not generally interfere with one another, the same CSI-RS port resources can be transmitted by non-overlapping small cells.

In one implementation, the CSI-RS group concept introduced above is extended so that each of the small cells may be added as an independent member of the CSI-RS group. For example, the CSI-RS group shown in this example is extended from a group size of 12 to 13, with small cells SC#1, SC#2, SC#3 each using the same CSI-RS port resources and corresponding functionally to a CSI-RS group member A13. As shown in FIG. 15, because the small cells do not overlap, small cells #1, #2, and #3 can each use the same CSI-RS ports defined for CSI-RS group member cell A13, whether or not the small cells are within the same macro cell coverage or different macro cell coverage. In this example, the group of small cells that use the same CSI-RS port resources are defined within the CSI-RS group as a CSI-RS subgroup.

When a small cell is installed or powered on, the small cell may be configured to detect the interference environment, i.e. interfering neighbor cells and report those interfering cells to the self organizing network (SON) manager. The SON manager may then assign the same CSI-RS port resources to non-overlapping small cells. For example, with reference to FIG. 15, the SON may receive reports from small cells #1 and #2 that macro cell A1 is interfering. In that case, neither small cell #1 or #2 reports that the other small cell is interfering. Accordingly, small cells #1 and #2 do not overlap with one another and may be assigned the same CSI-RS resources.

Figure 16:
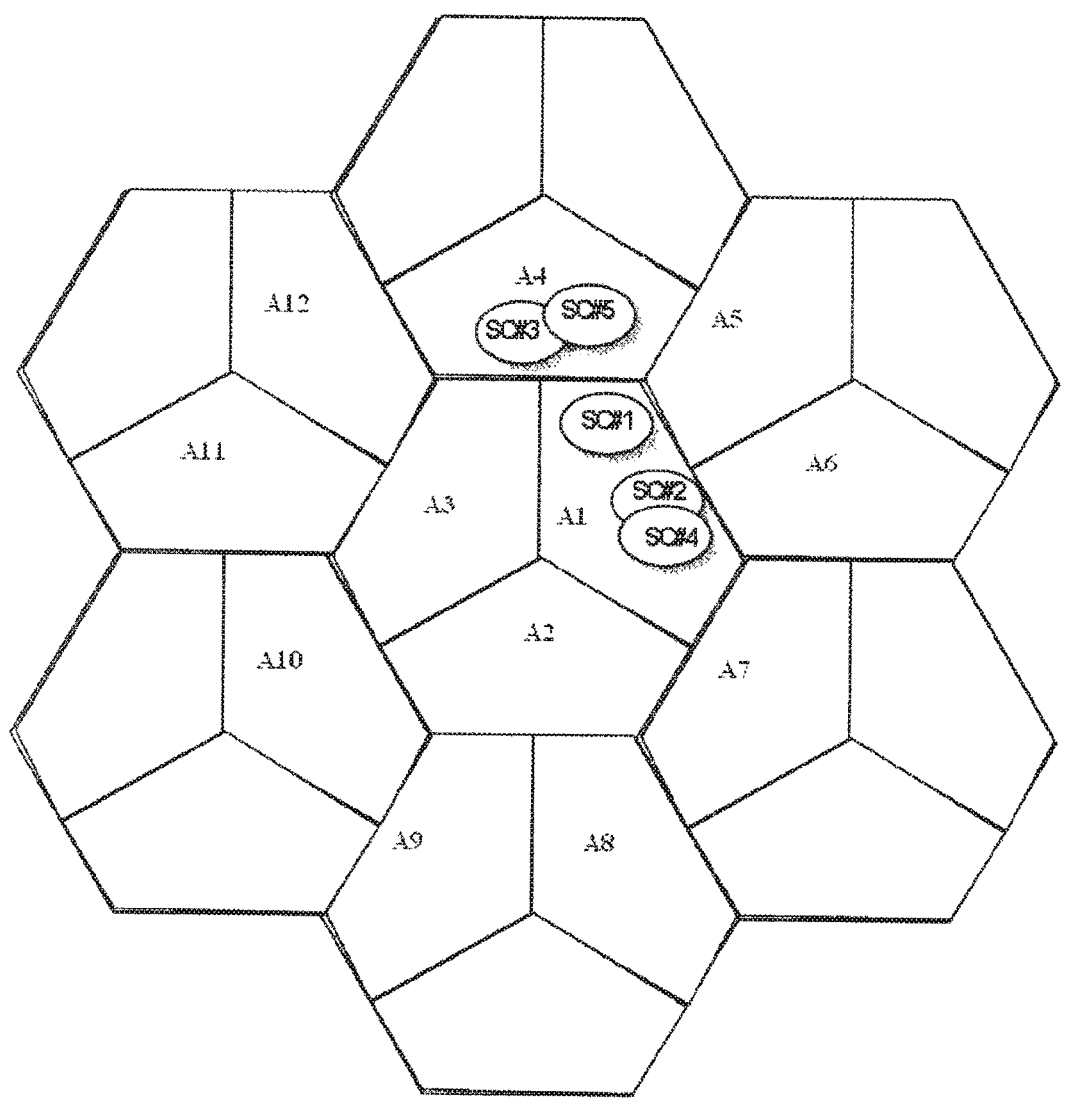
FIG. 16 is an illustration of an alternative small cell network deployment where one or more of the small cells overlap.

FIG. 16 is an illustration of an alternative small cell network deployment where one or more of the small cells overlap. In FIG. 16, the coverage of SC#3 and SC#5 overlaps, and the coverage of SC#2 and SC#4 overlaps. Due to the interference between the overlapping small cells, the CSI-RS transmitted by these overlapping small cells is orthogonal. As a result, the CSI-RS group size becomes 14. The macro cells (A1-A12) provide 12 members of the CSI-RS group. Small cell #1, #2, and #3 each provide a single member as they do not interfere with one another. Small cells #4 and #5 each provide a single additional member of the CSI-RS group as they are each allocated CSI-RSs that are orthogonal to those used by small cells #1, #2 and #3.

In the example shown in FIG. 16, two CSI-RS subgroups are defined within the CSI-RS group. CSI-RS subgroup 1 consists of SC#1, SC#2 and SC#3 which transmit CSI-RS port resources that correspond to A13. CSI-RS subgroup 2 consists of SC#4 and SC#5 which transmits CSI-RS port resources that correspond to A14. Based upon reported interference situations, the network may select the CSI-RS to be assigned to the small cells. When a small cell is installed or powered on, for example, the small cell may detect the interference environment, i.e. interfering neighbor cells and report the interference environment to the self organizing network (SON) manager. The SON manager may then assign different CSI-RS port resources to the overlapping small cells.

Alternatively, the CSI-RS port resources used by some of the small cells do not have to be orthogonal to all the CSI-RS port resources used by the macro cells within the CSI-RS group. Depending upon the location of a small cell, for example, the CSI-RS port resources used may only need to be orthogonal to the CSI-RS port resources used by interfering macro cells (and other small cells with overlapped coverage area) within the CSI-RS group.

Figure 17:
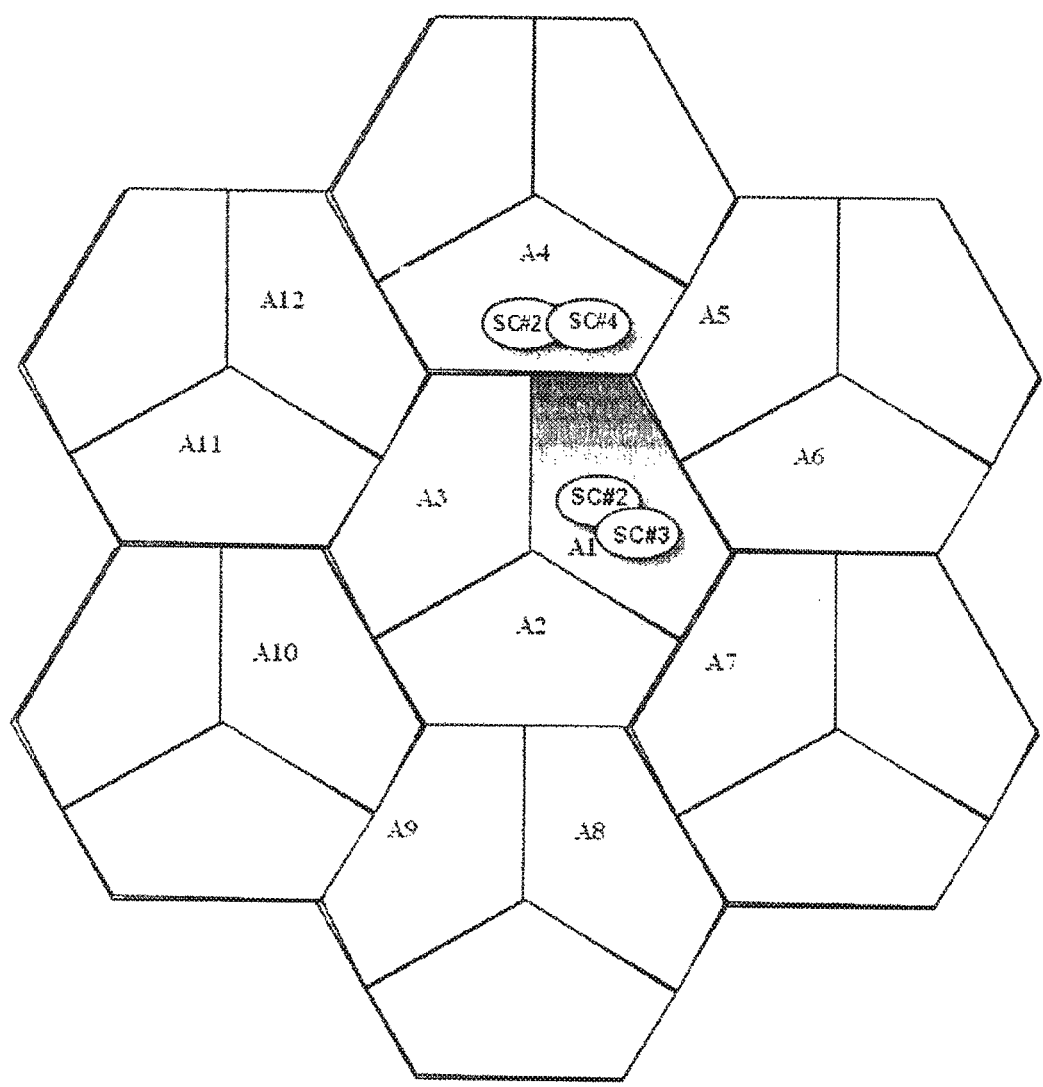
FIG. 17 is an illustration of a network implementation including an overlay of small cells on top of macro cell coverage where, in some cases, the coverage of the small cells overlaps.

For example, FIG. 17 is an illustration of a network implementation including an overlay of small cells on top of macro cell coverage, in some cases the coverage of the small cells overlaps. As shown in FIG. 17, the interfering macro cells to small cell #2 and small cell #4 are the cells corresponding to A1, A3, A4, A5, and A12 within the CSI-RS group. Therefore, small cell #2 and small cell #4 can use the CSI-RS port resources corresponding to A2, A6, A7, A8, A9, A10, A11 as long as small cell #2 and small cell #4 use different CSI-RS port resources between themselves. In this example, small cell #1 and small cell #3 are close to the cell site of A1 and observe minimal interference from other neighbor macro cells. Therefore, small cell #1 and small cell #3 can use any of the CSI-RS port resources corresponding to A2 through A12 as long as small cell #1 and small cell #3 use different CSI-RS port resources between themselves. As such, the CSI-RS port resources used by small cell #1 and small cell #3 may be the same as those used by small cell #2 and small cell #4 as the cells do not have overlapping coverage area. Alternatively, the CSI-RS port resources of the macro cells within the CSI-RS group may be re-used in the small cells.

In the case that the number of small cells is relatively large, two layers of CSI-RS allocation may be used. The small cells may be allocated to a first tier grouping and the macro cells may be allocated to a second tier. The common CSI-RS group may be assigned to cells of both the first and second tiers, but any first tier group having the same CSI-RS resource allocation may not be overlapped in coverage area with any second tier group having the same CSI-RS resource allocation. In some cases, overlapping may be allowed (but limited) if the interference scenario is controllable.

In the case where a small cell moves from one location to another, e.g., in the case of a mobile relay node or moving pico cell, a separate set of CSI-RS port resources may be reserved for moving small cells. These CSI-RS port resources may be separate or orthogonal from those used for macro cells and/or static small cells. Accordingly, as a small cell moves from one location to another, the small cell's CSI-RS will not interfere with the CSI-RS transmitted by other macro cells or static small cells.

Different moving small cells may be assigned different CSI-RS port resources within the set of CSI-RS port resources reserved for moving small cells. To avoid CSI-RS interference between moving small cells, moving small cells located within the same macro cell coverage area may use different CSI-RS port resources. As a moving small cell moves from one macro cell coverage area to another, the CSI-RS port resources used by the moving small cell may change. The allocation, reservation and coordination of CSI-RS port resources for moving small cells, static small cells and macro cells may be performed by a SON manager.

Alternatively, when the small cell is moving, the moving small cell is configured to continuously monitor strongly interfering neighboring cells. In that case, a CSI-RS is selected and re-selected based upon the updated strong interfering neighboring cell set captured and broadcast by the moving small cell to reduce the interference. This can be done by the network in a distributed manner or centralized control manner, e.g. by an SON manager. The small moving cell may send the updated CSI-RS to attached UEs via BCCH signaling or dedicated signaling.

Alternatively, the set of CSI-RS port resources used by the moving small cells may not be fully separated from those used by macro cells and/or static small cells. The CSI-RS port resources used by a moving small cell may be based on the current location of the moving small cell and the interfering neighbor macro cells. The CSI-RS port resources used by a moving small cell may be orthogonal to those used by interfering macro cells as well as those used by other small cells (moving or static) located within the coverage of the interfering macro cells. Alternatively, the CSI-RS port resources used by a moving small cell are orthogonal to those used by interfering macro cells as well as those used by other small cells (moving or static) located within the same macro cell coverage area as the moving small cell. The CSI-RS port resources used by a moving small cell may be orthogonal to those used by the macro cell where the moving small cell is currently located as well as those used by other small cells (moving or static) located within the same macro cell coverage area as the moving small cell. As the moving small cell moves, the CSI-RS port resources used may change based on the interference environment.

In the case of UEs moving at a high rate of speed, a more frequent occurrence of CSI-RS subframe broadcasting may be used to provide reliable channel information for efficient scheduling, precoder selection and link adaptation. For example, in one implementation of the present system, the CSI-RS is transmitted as described above, but an additional occurrence of CSI-RS broadcast is performed within the radio frame and is intended for higher speed mobiles. The additional set of CSI-RSs may be referred to as a supplemental CSI-RS.

Figure 18:
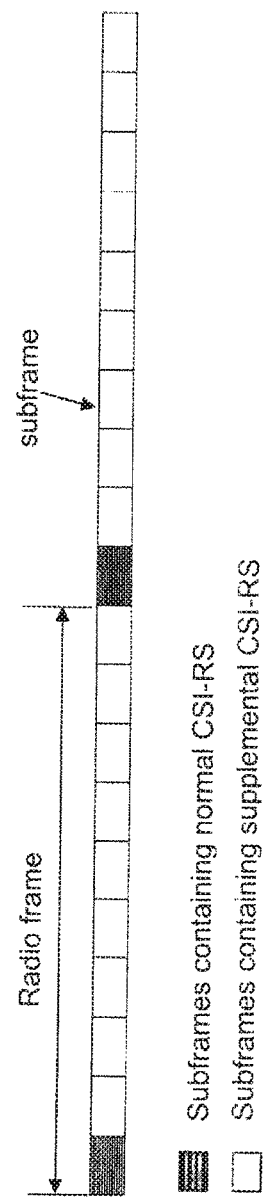
FIG. 18 is an illustration of interleaved normal and supplemental CSI-RS subframe locations, each having a periodicity of 10 subframes (or one frame)

The periodicity of the supplemental CSI-RS subframe may be the same or greater than the normal CSI-RS subframe periodicity. For example, the periodicity of both the normal CSI-RS subframe and the supplemental CSI-RS subframe are the same, however the location of the subframes are interleaved ensuring maximum separation in time. FIG. 18 is an illustration of interleaved normal and supplemental CSI-RS subframe locations, each having a periodicity of 10 subframes (or one frame).

The transmission of the supplemental CSI-RS may be semi-statically configured by the network. The configuration of the supplemental CSI-RS transmission may be changed from time to time based on current radio conditions, mobile speed, and cell loading conditions. For example, in the case that a cell is over-loaded, the supplemental CSI-RS transmission may be stopped to allow more user data transmission. Alternatively, when cell loading is light and the number of high speed UEs is large, the network may configure more supplemental CSI-RS transmissions to allow more accurate CSI estimation, for example, along high-speed roadways, railways, or other high-speed avenues where UEs are likely to be moving at high speed.

The normal CSI-RS and supplemental CSI-RS broadcasts may occur on the same subframe for certain subframes. In that case, normal CSI-RSs and supplemental CSI-RSs may be transmitted on different RBs or the same RBs.

The number of antenna ports supported by the supplemental CSI-RS may be equal to or less than that of the normal CSI-RS to limit overhead. Supplemental CSI-RS antenna ports may be mapped to RE's in the same patterns as those presented for the normal CSI-RS. For example, the normal CSI-RS may use N (e.g. N=8) antenna ports per RB, however the supplemental CSI-RS may only support M≤N (e.g. M=2) antenna ports per RB.

In some cases, the number of antenna ports and RE's used for the supplemental CSI-RS is smaller than the normal CSI-RS as a lower the number of antennas or virtual antenna streams is supported. For example, if the normal CSI-RS supports 8 antenna ports with 1 RE per RB for each antenna port, the supplemental CSI-RS may support 2 antenna ports with 1 RE per RB for each antenna port.

In some configurations, UEs can use the normal CSI-RS for CSI estimation of a larger set of antennas and can use the supplemental CSI-RS for additional CSI estimation (i.e. more frequent information) for a subset of the antennas. Some UEs may use only those antennas or spatial dimensions that are common to both normal and supplemental CSI-RS for CSI estimation. This can benefit higher speed UEs that may require fewer antennas and in general lower rank transmissions; however this configuration may require more frequent CSI-RS broadcasts due to faster changing channel conditions.

A UE that has slowly changing channel conditions and is capable of supporting higher rank transmission may ignore the supplemental CSI-RS if the UE does not have sufficient information (e.g., how each supplemental CSI-RS antenna port is mapped to or linearly/non-linearly combined from the normal CSI-RS antenna ports) to resolve individual normal CSI-RS antenna ports from the supplemental CSI-RS antenna ports. In general, however, if the UE has the supplemental CSI-RS information, for example, via the reception of the BCCH or dedicated RRC signaling, the UE may use the CSI-RS for better CSI measurement.

UEs can select, or alternatively can be configured by the network, to use and report either the normal CSI-RS, the supplemental CSI-RS or a combination of normal and supplemental CSI-RSs for CSI estimation. Likewise, the feedback on the UL from the UE may indicate whether the CSI feedback is based on the format of the supplemental CSI-RS ports, or the normal CSI-RS ports. Alternatively, UEs may be configured by the network to provide CSI feedback according to one of the CSI-RS formats.

A UE using normal CSI-RS ports may also feedback CSI according to the format of the supplemental CSI-RS antenna ports depending on the mapping rule between the normal CSI-RS antenna ports and the supplemental CSI-RS antenna ports and whether the UE provided sufficient information regarding the mapping rule.

In one implementation, the antenna ports for the supplemental CSI-RS are a subset of those used for the normal CSI-RS and may be mapped according to a pre-determined allocation of ports, for example. An example mapping of ports is illustrated below in Table 2. The system can then use one of these configurations that may be indicated to a UE by the row index, for example. To limit the signaling needed for the row index, different tables can be used for each number of normal CSI-RS antenna ports. Alternatively, the network may signal the supplemental CSI-RS port and the mapped normal CSI-RS port in a list-based format via RRC signaling. In some cases the table may indicate both the antenna port mapping and the number of supplemental CSI-RS ports, given a specific number of normal CSI-RS antenna ports. The table could be semi-statically configured by the base station.

Accordingly, Table 2 and Table 3 illustrate possible mapping tables for 4 and 8 normal CSI-RS antenna ports, respectively. The number of supplemental antenna ports as well as the mapping rule may then be indicated by specifying a row index for the table.

TABLE 2

| Row Index | Supplemental CSI-RS Port | | | |
|---|---|---|---|---|
| | 1 | 2 | 3 | 4 |
| | Corresponding Normal CSI-RS Port | | | |
| 1 | 1 | 2 | 3 | 4 |
| 2 | 1 | 3 | — | — |
| 3 | 2 | 4 | — | — |
| 4 | 1 | — | — | — |

TABLE 3

| Row Index | Supplemental CSI-RS Port | | | | | | | |
|---|---|---|---|---|---|---|---|---|
| | 1 | 2 | 3 | 4 | 5 | 6 | 7 | 8 |
| | Corresponding Normal CSI-RS Port(s) | | | | | | | |
| 1 | 1 | 2 | 3 | 4 | 5 | 6 | 7 | 8 |
| 2 | 1 | 3 | 5 | 7 | — | — | — | — |
| 3 | 2 | 4 | 6 | 8 | — | — | — | — |
| 4 | 1 | 4 | — | — | — | — | — | — |
| 5 | 5 | 8 | — | — | — | — | — | — |
| 6 | 1 | 8 | — | — | — | — | — | — |
| 7 | 1 | 2 | — | — | — | — | — | — |
| 8 | 1 | — | — | — | — | — | — | — |

In some cases, the number of row indices for each table (where there is a table for each number of normal CSI-RS antenna ports) may be the same. This may allow the field size for the indication of the row index for supplemental CSI-RS ports and port mapping to be constant regardless of the number of normal CSI-RS antenna ports.

UEs that use both normal and supplemental CSI-RS may have more frequent CSI on the antenna ports that are contained in the normal and supplement antenna port sets, than those UEs that use normal CSI-RS only. UEs using supplemental CSI-RS ports may be configured to feedback CSI accordingly to the format of the supplemental CSI-RS antenna ports.

In some cases, the antennas ports for the supplemental CSI-RS are linear or non-linear combinations of those used for the normal CSI-RS. In practice, a table or precoding matrices set may be created for selected mappings of ports. The system can then use one of these configurations which can be indicated by the row index or precoding matrix index (PMI). To limit the signaling needed for the row index or PMI, different tables or different sets of precoding matrices can be used for each number of normal CSI-RS antenna ports.

In some cases, the table or precoding matrices set may indicate both the antenna port mapping and number of supplemental CSI-RS ports, given a specific number normal CSI-RS antenna ports. Table 4 and Table 5 illustrate example possible mapping tables for 4 and 8 normal CSI-RS antenna ports mapping to supplemental CSI-RS antenna ports. In the example, linear or other combinations of the normal CSI-RS antenna ports may be used to form the supplemental CSI-RS antenna ports. In these cases, the number of supplemental CSI-RS antenna ports as well as the mapping rule may be indicated by specifying a row index for the table.

TABLE 4

| Row Index | Supplemental CSI-RS Port | | | |
|---|---|---|---|---|
| | 1 | 2 | 3 | 4 |
| | Corresponding Normal CSI-RS Port | | | |
| 1 | 1 | 2 | 3 | 4 |
| 2 | 1 + 2 | 3 + 4 | — | — |
| 3 | 1 + 2 | 4 | — | — |
| 4 | 1 | — | — | — |

TABLE 5

| Row Index | Supplemental CSI-RS Port | 1 | 2 | 3 | 4 | 5 | 6 | 7 | 8 |
|---|---|---|---|---|---|---|---|---|---|
| | | Corresponding Normal CSI-RS Port(s) | | | | | | | |
| 1 | | 1 | 2 | 3 | 4 | 5 | 6 | 7 | 8 |
| 2 | | 1 + 2 | 3 + 4 | 5 + 6 | 7 + 8 | — | — | — | — |
| 3 | | 1 + 5 | 2 + 6 | 3 + 7 | 4 + 8 | — | — | — | — |
| 4 | | 1 + 2 + 3 + 4 | 5 + 6 + 7 + 8 | — | — | — | — | — | — |
| 5 | | 1 + 2 | 7 + 8 | — | — | — | — | — | — |
| 6 | | 1 | 8 | — | — | — | — | — | — |
| 7 | | 1 + 8 | — | — | — | — | — | — | — |
| 8 | | 1 | — | — | — | — | — | — | — |

In some cases, the number of row indices for each table (where there is a table for each number of normal CSI-RS antenna ports) may be the same. This allows the field size for the indication of the row index for supplemental CSI-RS ports and port mapping to be constant regardless of the number of normal CSI-RS antenna ports.

As described, UEs that use both normal and supplemental CSI-RS may have more frequent CSI on the antenna ports that are contained in the normal and supplement antenna port sets than those UEs that use normal CSI-RS antenna ports only. UEs using both the normal and supplemental CSI-RS may need to perform linear operations on the measurements obtained from the normal CSI-RS antenna ports to properly match the spatial orientation of the supplemental CSI-RS antenna ports. UEs using supplemental CSI-RS ports may feedback channel information according to the format of the supplemental CSI-RS antenna ports.

PDSCH RE muting as described above may be used for the normal CSI-RS subframe/RB. Alternatively, PDSCH REs corresponding to supplemental CSI-RS's from neighbor cells are not muted as CoMP operations based on short term channel conditions may not be supported for higher speed mobiles. In these cases, the relative overhead associated with the supplemental CSI-RS in comparison to the normal CSI-RS is small.

The number of RE's per RB per antenna port or virtual antenna stream may be different for normal CSI-RS and supplemental CSI-RS due to different constraints on the reliability of CSI. Similarly, the periodicity of the supplemental CSI-RS subframe may be variable. In some cases, there may exist additional parameters needed by the UE for proper operation using the supplemental CSI-RS such as a supplemental CSI-RS format. The parameters and periodicity of the supplemental CSI-RS may be indicated in the SIB in a broadcast manner, or sent to a UE in a unicast or multicast manner as needed.

Figure 19:
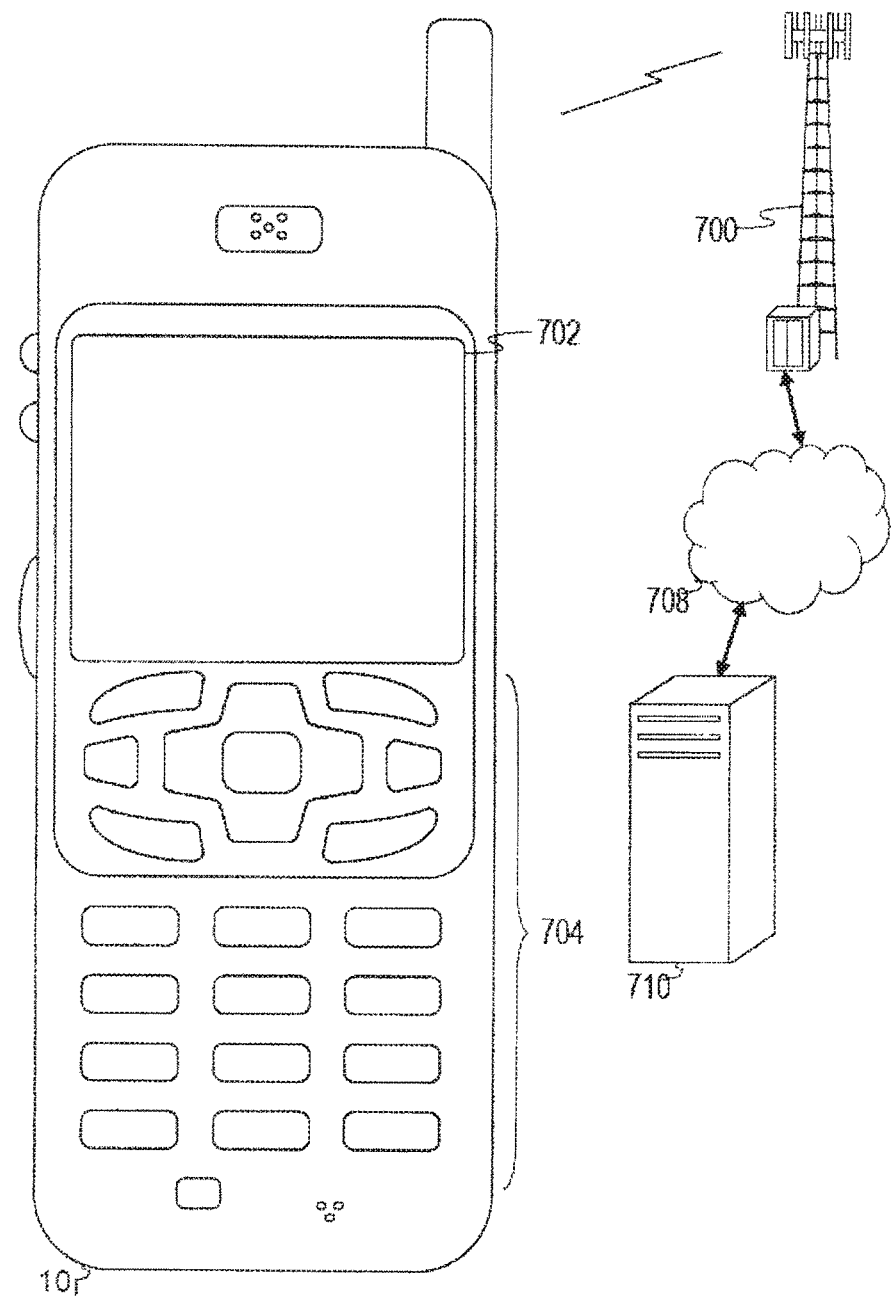
FIG. 19 is a diagram of a wireless communications system including a UE operable for some of the various embodiments of the disclosure.

FIG. 19 illustrates a wireless communications system including an embodiment of UE 10. UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 702 to show a web page. The web page may be obtained via wireless communications with a wireless network access node, a cell tower, a peer UE 10, or any other wireless communication network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 20:
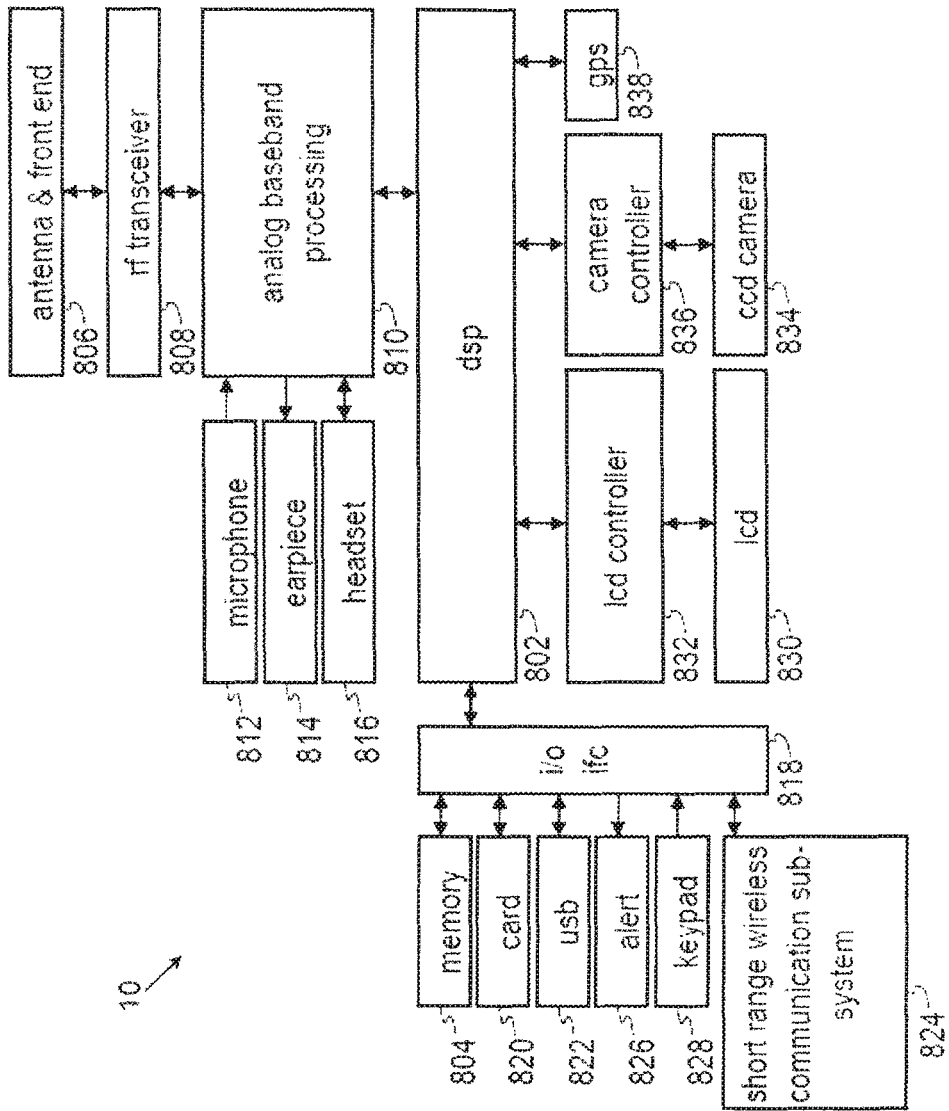
FIG. 20 is a block diagram of a UE operable for some of the various embodiments of the disclosure.

FIG. 20 shows a block diagram of the UE 10. While a variety of known components of UEs 110 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UE 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 21:
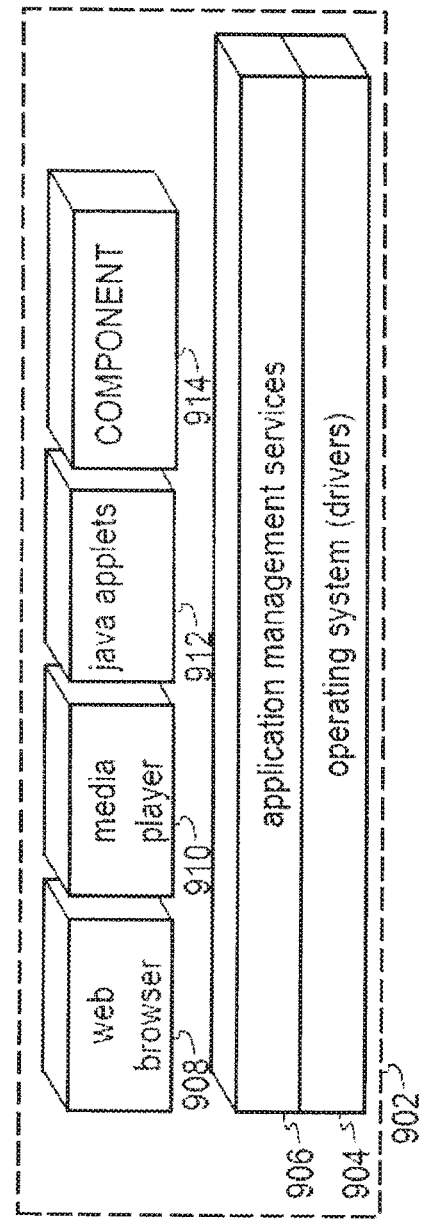
FIG. 21 is a diagram of a software environment that may be implemented on a UE operable for some of the various embodiments of the disclosure.

FIG. 21 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services ("AMS") 906 that transfer control between applications running on the UE 10. Also shown in FIG. 21 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audiovisual media. The Java applets 912 configure the UE 10 to provide games, utilities, and other functionality. A component 914 might provide functionality described herein.

Figure 22:
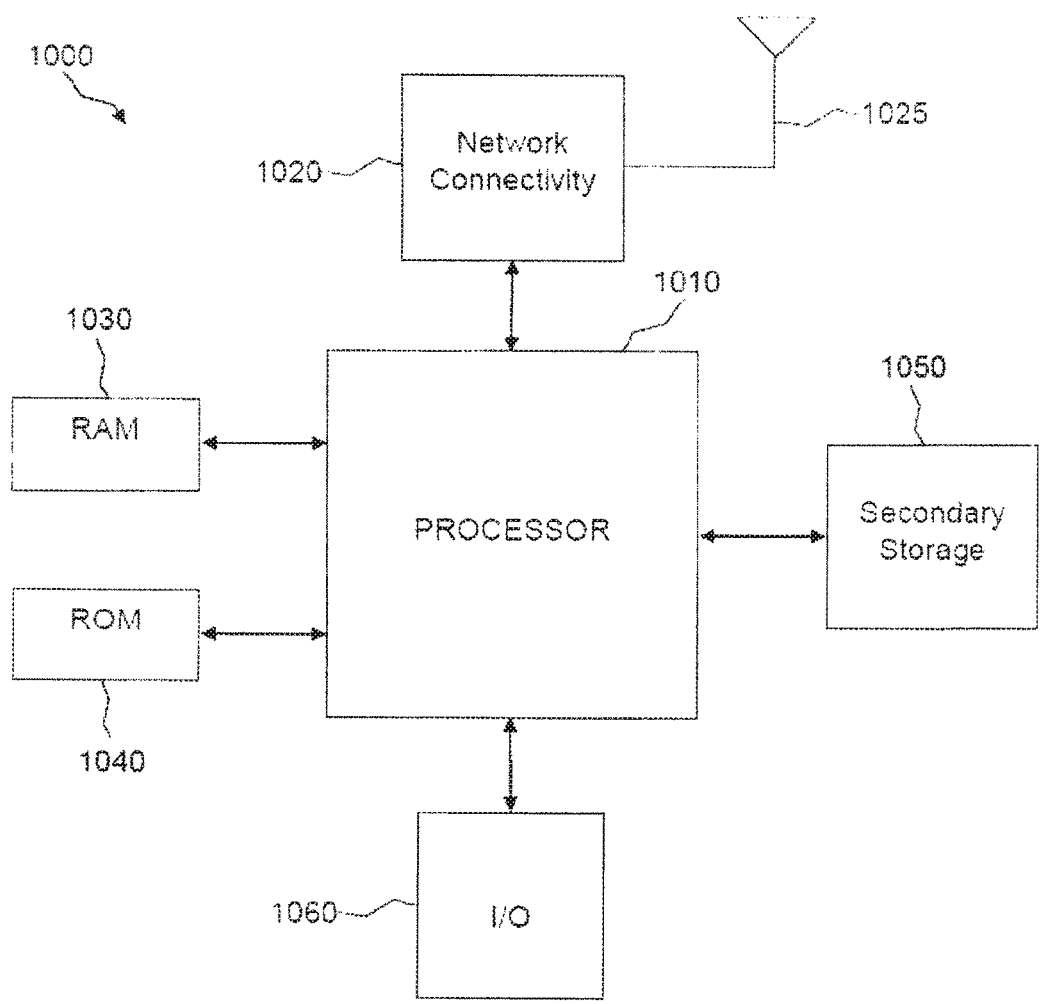
FIG. 22 is an illustrative general purpose computer system suitable for some of the various embodiments of the disclosure.

The UE 10, base station 120, and other components described above might include a processing component that is capable of executing instructions related to the actions described above. FIG. 22 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

1. A method, comprising:
    assigning, at a base station, a resource block (RB) group to a set of cells, the base station associated with a serving cell of a user equipment (UE), the set of cells including the serving cell;
    receiving, from the UE, a measurement report identifying a set of neighbor cells as interfering with the UE;
    determining whether the set of neighbor cells and the serving cell are within the set of cells;
    in response to determining that the set of neighbor cells and the serving cell are within the set of cells, transmitting configuration information of the RB group to the UE; and
    muting one or more resource elements (REs) within a data channel transmission to the UE based on the configuration information of the RB group, wherein the REs are included in the RB group.

2. The method of claim 1, further comprising performing the data channel transmission to the UE using REs within the RB group.

3. The method of claim 1, wherein the RB group includes at least one RB, and the configuration information includes information of the at least one RB in the RB group.

4. The method of claim 1, wherein the configuration information includes information of REs used for channel state information reference signals (CSI-RSs) of the set of cells excluding the serving cell.

5. The method of claim 4, wherein the muted one or more REs includes REs used for CSI-RSs of the set of cells excluding the serving cell.

6. The method of claim 4, wherein the UE decodes a CSI-RS of an interfering neighbor cell based on the configuration information, and the UE determines the muted one or more REs in the data channel transmission based on the configuration information.

7. The method of claim 1, wherein the configuration information is transmitted to the UE using at least one of a system information block (SIB) broadcast message or a dedicated radio resource control (RRC) message.

8. An apparatus, comprising:
    a memory; and
    at least one hardware processor communicatively coupled with the memory and configured to:
        assign, at a base station, a resource block (RB) group to a set of cells, the base station associated with a serving cell of a user equipment (UE), the set of cells including the serving cell;
        receive, from the UE, a measurement report identifying a set of neighbor cells as interfering with the UE;
        determine whether the set of neighbor cells and the serving cell are within the set of cells;
        in response to determining that the set of neighbor cells and the serving cell are within the set of cells, transmit configuration information of the RB group to the UE; and
        mute one or more resource elements (REs) within a data channel transmission to the UE based on the configuration information of the RB group, wherein the REs are included in the RB group.

9. The apparatus of claim 8, wherein at least one hardware processor is further configured to perform the data channel transmission to the UE using REs within the RB group.

10. The apparatus of claim 8, wherein the RB group includes at least one RB, and the configuration information includes information of the at least one RB in the RB group.

11. The apparatus of claim 8, wherein the configuration information includes information of REs used for channel state information reference signals (CSI-RSs) of the set of cells excluding the serving cell.

12. The apparatus of claim 11, wherein the muted one or more REs includes REs used for CSI-RSs of the set of cells excluding the serving cell.

13. The apparatus of claim 11, wherein the UE decodes a CSI-RS of an interfering neighbor cell based on the configuration information, and the UE determines the muted one or more REs in the data channel transmission based on the configuration information.

14. The apparatus of claim 8, wherein the configuration information is transmitted to the UE using at least one of a system information block (SIB) broadcast message or a dedicated radio resource control (RRC) message.

15. A non-transitory computer-readable medium containing instructions which, when executed, cause a computing device to perform operations comprising:
    assigning, at a base station, a resource block (RB) group to a set of cells, the base station associated with a serving cell of a user equipment (UE), the set of cells including the serving cell;
    receiving, from the UE, a measurement report identifying a set of neighbor cells as interfering with the UE;
    determining whether the set of neighbor cells and the serving cell are within the set of cells;
    in response to determining that the set of neighbor cells and the serving cell are within the set of cells, transmitting configuration information of the RB group to the UE; and
    muting one or more resource elements (REs) within a data channel transmission to the UE based on the configuration information of the RB group, wherein the REs are included in the RB group.

16. The non-transitory computer-readable medium of claim 15, wherein the operations further comprise performing the data channel transmission to the UE using REs within the RB group.

17. The non-transitory computer-readable medium of claim 15, wherein the RB group includes at least one RB, and the configuration information includes information of the at least one RB in the RB group.

18. The non-transitory computer-readable medium of claim 15, wherein the configuration information includes information of REs used for channel state information reference signals (CSI-RSs) of the set of cells excluding the serving cell.

19. The non-transitory computer-readable medium of claim 18, wherein the muted one or more REs includes REs used for CSI-RSs of the set of cells excluding the serving cell.

20. The non-transitory computer-readable medium of claim 15, wherein the configuration information is transmitted to the UE using at least one of a system information block (SIB) broadcast message or a dedicated radio resource control (RRC) message.

\* \* \* \* \*